(12) United States Patent
Nakano et al.

(10) Patent No.: US 8,682,140 B2
(45) Date of Patent: Mar. 25, 2014

(54) PLAYBACK DEVICE, CONTENT DISTRIBUTION SYSTEM, PLAYBACK METHOD, COMPUTER PROGRAM AND INTEGRATED CIRCUIT

(75) Inventors: Toshihisa Nakano, Osaka (JP); Masataka Minami, Hyogo (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 60 days.

(21) Appl. No.: 13/496,956

(22) PCT Filed: Mar. 24, 2011

(86) PCT No.: PCT/JP2011/001749
§ 371 (c)(1),
(2), (4) Date: Mar. 19, 2012

(87) PCT Pub. No.: WO2011/118222
PCT Pub. Date: Sep. 29, 2011

(65) Prior Publication Data
US 2012/0189281 A1    Jul. 26, 2012

(30) Foreign Application Priority Data
Mar. 26, 2010    (JP) ................................. 2010-071905

(51) Int. Cl.
*H04N 5/91*    (2006.01)
(52) U.S. Cl.
USPC ........................................................ 386/252
(58) Field of Classification Search
None
See application file for complete search history.

(56) References Cited

U.S. PATENT DOCUMENTS

| | | |
|---|---|---|
| 2001/0017885 A1 | 8/2001 | Asai et al. |
| 2002/0184515 A1 | 12/2002 | Oho et al. |
| 2003/0110213 A1 | 6/2003 | Munetsugu et al. |
| 2003/0140009 A1 | 7/2003 | Namba et al. |

(Continued)

FOREIGN PATENT DOCUMENTS

| | | |
|---|---|---|
| JP | 2001-242786 | 9/2001 |
| JP | 2003-22377 | 1/2003 |

(Continued)

OTHER PUBLICATIONS

International Search Report issued Apr. 19, 2011 in corresponding International Application No. PCT/JP2011/001749.

(Continued)

*Primary Examiner* — Hung Dang
*Assistant Examiner* — Sunghyoun Park
(74) *Attorney, Agent, or Firm* — Wenderoth, Lind & Ponack, L.L.P.

(57) ABSTRACT

To provide a playback device capable of requesting for a content generated in a format compatible with its processing capability and playing back the content, with no need of user input of a user ID or the like. A playback device for playing back contents reads, from an external recording medium, a playback right of a content to play back one or more contents that each have been generated based on a content and in a format compatible with a processing capability different for each playback device, and transmits the playback right and capability information indicating a processing capability of the playback device to a server device. The playback device acquires, from the server device, one of the one or more contents corresponding to the playback right in a format compatible with its processing capability indicated by the capability information, and plays back the acquired content.

18 Claims, 33 Drawing Sheets

Index information

| Title name | Resolution | File format | Copyright protection method |
|---|---|---|---|
| ABC | QVGA | Format A | Method X |
| | VGA | Format B | Method Y |

(56) References Cited

U.S. PATENT DOCUMENTS

| | | |
|---|---|---|
| 2004/0139338 A1 | 7/2004 | Ohmori et al. |
| 2005/0011942 A1 | 1/2005 | Adachi |
| 2005/0125354 A1* | 6/2005 | Pisaris-Henderson et al. .. 705/52 |
| 2005/0273399 A1 | 12/2005 | Soma et al. |
| 2006/0195513 A1* | 8/2006 | Rogers et al. ................. 709/203 |
| 2007/0009232 A1 | 1/2007 | Muraki et al. |
| 2007/0011709 A1 | 1/2007 | Katz et al. |
| 2007/0083772 A1 | 4/2007 | Harada et al. |
| 2007/0157234 A1 | 7/2007 | Walker |
| 2007/0266171 A1 | 11/2007 | Munetsugu et al. |
| 2008/0072072 A1* | 3/2008 | Muraki et al. ................. 713/193 |
| 2009/0317065 A1* | 12/2009 | Fyock et al. .................. 386/124 |
| 2010/0036966 A1 | 2/2010 | Munetsugu et al. |
| 2010/0319038 A1* | 12/2010 | Devassykutty et al. ......... 725/82 |

FOREIGN PATENT DOCUMENTS

| | | |
|---|---|---|
| JP | 2003-173381 | 6/2003 |
| JP | 2003-233597 | 8/2003 |
| JP | 2005-38167 | 2/2005 |
| JP | 2005-351994 | 12/2005 |
| JP | 2008-198272 | 8/2008 |
| WO | 2005/020234 | 3/2005 |

OTHER PUBLICATIONS

Extended European Search Report issued Aug. 16, 2013 in corresponding Application No. 11759031.5.

* cited by examiner

FIG.3

Key group

| Enc(device key 1, media key) |
| Enc(device key 2, media key) |
| Enc(device key 3, media key) |
| ⋮ |
| Enc(device key N, media key) |

FIG.4

Index information

| Title name | Resolution | File format | Copyright protection method |
|---|---|---|---|
| ABC | QVGA | Format A | Method X |
| | VGA | Format B | Method Y |

FIG.5

Purchase certificate

| | | | |
|---|---|---|---|
| Title name | | | ABC |
| Card identifier | | | 0x321···ADE |
| Acquisition permission information and destination information | QVGA | Permitted or not | 0x01 |
| | | Destination information | http://www.qvga.xxx |
| | VGA | Permitted or not | 0x01 |
| | | Destination information | http://www.vga.xxx |
| | FHD | Permitted or not | 0x01 |
| | | Destination information | http://www.fhd.xxx |
| Signature | | | Sig(SK, ABC ‖ 0x321···ADE ‖ 0x01 ‖ 0x01 ‖ 0x01) |

FIG.9

Attribute information

| | |
|---|---|
| Resolution of display | FHD |
| Compatible file format | Formats A, B, and C |
| Compatible copyright protection method | Methods X, Y, and Z |

FIG.10

Index information

| Title name | Resolution | File format | Copyright protection method |
|---|---|---|---|
| AAA | QVGA | Format A | Method X |

FIG.11

Index information

| Title name | Resolution | File format | Copyright protection method |
|---|---|---|---|
| AAA | QVGA | Format A | Method X |
| | FHD | Format C | Method Y |

FIG.13

| Title name | Resolution | File format | Copyright protection method | Encrypted content |
|---|---|---|---|---|
| ABC | QVGA | Format A | Method X | Encrypted content 1 |
|  | VGA | Format B | Method Y | Encrypted content 2 |
|  | FHD | Format A | Method X | Encrypted content 3 |
| ... | ... | ... | ... | ... |
| XYZ | QVGA | Format A | Method X | Encrypted content n |
|  | VGA | Format B | Method Y | Encrypted content n+1 |
|  | FHD | Format A | Method X | Encrypted content n+2 |
| ... | ... | ... | ... | ... |

Index information

| Title name | Resolution | File format | Copyright protection method |
|---|---|---|---|
| AAA | QVGA | Format A | Method X |
|  | VGA | Format B | Method Y |
|  | FHD | Format C | Method Z |

FIG.21A

Encrypted content

| Title name | Resolution | Encrypted content |
|---|---|---|
| AAA | QVGA | Encrypted content 1 |
| | VGA | Encrypted content 2 |
| | FHD | Encrypted content 3 |

FIG.21B

Encrypted title key

| Title name | Resolution | Encrypted title key |
|---|---|---|
| AAA | QVGA | Encrypted title key 1 |
| | VGA | Encrypted title key 2 |
| | FHD | Encrypted title key 3 |

FIG.23

Attribute information

| Resolution of display | QVGA |
|---|---|
| Compatible file format | Format A |
| Compatible copyright protection method | Method X |

FIG.33

Purchase certificate

| Title name | ABC |
|---|---|
| Card identifier | 0x321···ADE |
| Destination information | http://www.abc.xxx |
| Signature | Sig(SK, ABC ‖ 0x321···ADE) |

PLAYBACK DEVICE, CONTENT DISTRIBUTION SYSTEM, PLAYBACK METHOD, COMPUTER PROGRAM AND INTEGRATED CIRCUIT

TECHNICAL FIELD

The present invention relates to a playback device for acquiring a content from a server device that manages digitized contents such as movie and music and playing back the acquired content, and particularly relates to an art of acquiring a content suitable for the playback device.

BACKGROUND ART

With the recent increase in capacity of recording media, there becomes widespread a system for distributing digitized contents (hereinafter, referred to simply as "contents") obtained by digitizing copyrighted works such as movie and music, recording the digitized contents in recording media, and playing back the digitized contents. In such a system, playback and copy of a content need to be performed only under authorization by an owner of a copyright of the content in order to protect the copyright of the content.

Also, in order to improve user's convenience in watching and acquiring contents under the above authorization, Patent Literature 1 discloses a system for allowing a user to watch a content, which the user has already purchased via his device, on another device without purchasing the content again via the other device.

According to the Patent Literature 1, content purchase information of a user is managed by a server device. Assume that a certain user purchases a content having a title name X via a device, and then he tries to again acquire the content having the title name X via another device, for example. In such a case, a user ID for identifying a user A is input into the other device, and is transmitted to the server device. If the server device checks that the certain user is identical with the user A by verifying whether the user ID has been authenticated, the server device distributes the content having the title name X also to the other device free of charge.

CITATION LIST

Patent Literature

[Patent Literature 1] Japanese Patent Application Publication No. 2005-351994

SUMMARY OF INVENTION

Technical Problem

By the way, in the case where a user owns a plurality of playback devices, all of the playback devices do not always have the same processing capability. There is a possibility that some of the playback devices have a high processing capability and others have a low processing capability. Here, a processing capability of a playback device indicates an image resolution, a file format, a copyright protection method, and so on which are supported by the playback device.

Assume a case where the user purchases a content (having a title name "X", for example) via a playback device and then tries to play back the purchased content in another playback device, the user wants to watch a content having the title name "X" that is compatible with a processing capability of the other playback device. In response to such a case, the system disclosed in the Patent Literature 1 allows the user to acquire an available content that is compatible with the processing capability of the other playback device. However, the user needs to input his user ID, again take a procedure for acquiring the content, and so on. It is troublesome for the user to perform such operations for each playback device having a different processing capability.

In view of the above problem, the present invention aims to provide a playback device, a content distribution system, a playback method, a computer program, and an integrated circuit that are capable of requesting for a content generated in a format compatible with a processing capability of the playback device and playing back the content, with no need of user input of a user ID or the like.

Solution to Problem

In order to achieve the above aim, the present invention provides a playback device for playing back contents, comprising: a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices; an acquisition unit operable to acquire, from the server device, one of the one or more contents corresponding to the playback right that is in a format compatible with the processing capability of the playback device indicated by the capability information; and a playback unit operable to play back the content acquired by the acquisition unit.

Advantageous Effects of Invention

With this structure, the playback device acquires the playback right recorded in the recording medium, and transmits the acquired playback right to the server device, together with the capability information indicating its processing capability. Then, the playback device acquires the content generated in the format compatible with its processing capability, and plays back the acquired content. Therefore, no user input is necessary. This allows the playback device to request for a content generated in a format compatible with its processing capability and play back the acquired content, with no need of user input of a user ID or the like.

BRIEF DESCRIPTION OF DRAWINGS

FIG. 3 shows an example of a key group.

FIG. 4 shows an example of index information.

FIG. 5 shows an example of a purchase certificate.

FIG. 9 shows an example of attribute information of the playback device 103.

FIG. 10 shows an example of index information before update.

FIG. 11 shows an example of index information after update.

FIG. 13 shows an example of an encrypted content held in an encrypted content holding unit 1103.

FIG. 20 shows an example of index information.

FIG. 21A shows an example of the data structure of an encrypted content, and FIG. 21B shows an example of the data structure of an encrypted title key.

FIG. 23 shows an example of attribute information of the portable playback device 1703.

FIG. 33 shows an example of a purchase certificate that does not contain acquisition permission information.

DESCRIPTION OF EMBODIMENTS

The following describes embodiments of the present invention with reference to the drawings.

1. Embodiment 1

1.1 Structure of Content Distribution System 1

Figure 1:
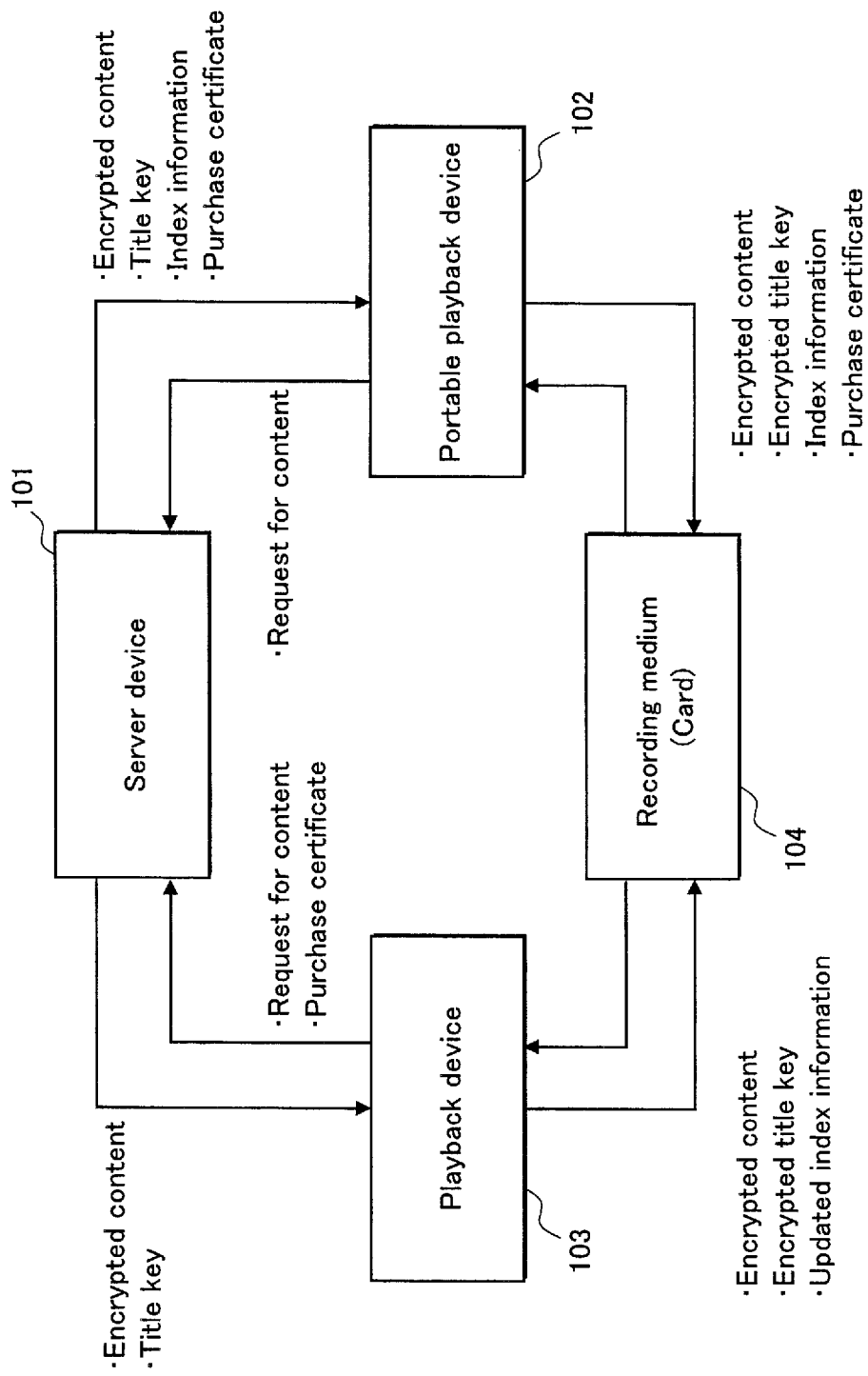
FIG. 1 shows the structure of a content distribution system 1.

A content distribution system 1 includes, as shown in FIG. 1, a server device 101, a portable playback device 102, a playback device 103, and a recording medium 104 (hereinafter, referred to as "card 104").

When receiving a request for a content from the portable playback device 102 or the playback device 103, the server device 101 verifies validity or authenticity of the request. When judging that distribution of the content is permitted as a result of the verification, the server device 101 distributes the content to the portable playback device 102 or the playback device 103 in response to the request. The details of the server device 101 are described in later.

When the card 104 is inserted into the portable playback device 102 by the user, the portable playback device 102 connects to the server device 101, and purchases a content designed for portable playback devices, which has a resolution and a bit rate suitable for portable playback devices, and records the purchased content into the inserted card 104. The user owning the portable playback device 102 watches the content designed for portable playback devices. The details of the portable playback device 102 are described in later.

When the card 104 is inserted into the playback device 103 by the user, the playback device 103 checks an attribute relating to playback of a content recorded in the card 104 and an attribute of the playback device 103 relating to content playback. When judging to connect to the server device 101 to receive a content, the playback device 103 connects to the server device 101 to request for the content and receive the content. The playback device 103 plays back the content while receiving the content. When reception of the content completes, the playback device 103 records the content into the card 104. The details of the playback device 103 are described in later. Here, an attribute of a device relating to content playback indicates a processing capability of a device for content playback. This attribute is, for example, a capability in terms of hardware, performance, and functions, such as an image resolution, a file format, and a copyright protection method that are supported by the device.

Note that, in order to perform communication between the server device 101 and the portable playback device 102 and communication between the server device 101 and the playback device 103, it is necessary to establish a secure communication path to transmit/receive data therebetween. A general method such as SSL may be employed for the communication, and description thereof is omitted here.

1.2 Structure of Recording Medium (Card) 104

Figure 2:
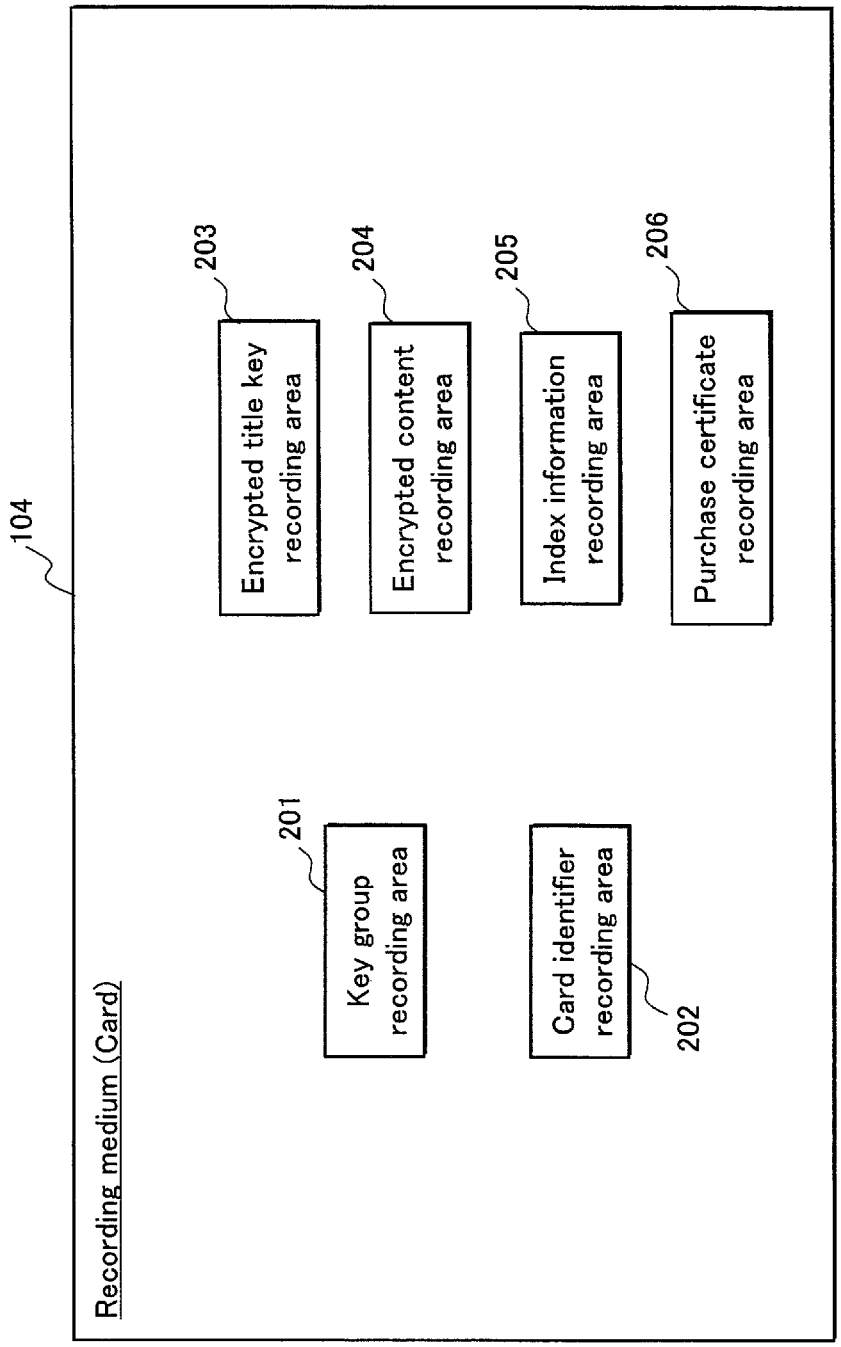
FIG. 2 is a block diagram showing the structure of a recording medium (card) 104.

The card 104 is composed of, as shown in FIG. 2, a key group recording area 201, a card identifier recording area 202, an encrypted title key recording area 203, an encrypted content recording area 204, an index information recording area 205, and a purchase certificate recording area 206.

The key group recording area 201 has recorded therein a group of one or more encrypted media keys obtained by encrypting with use of respective one or more device keys. FIG. 3 shows an example of a key group. According to the example shown in FIG. 3, media keys have been encrypted with use of respective N device keys including device keys 1, 2, . . . , N. Here, "Enc(A,B)" represents encryption of data B with use of data A as a key. Also, a general encryption algorithm may be employed for encryption such as DES and AES, and description thereof is omitted here.

The card identifier recording area 202 has recorded therein an identifier (ID) for uniquely identifying the card 104. This identifier is used for management of a content that has been transmitted.

The encrypted title key recording area 203 has recorded therein an encrypted title key, which is obtained by each of the portable playback device 102 and the playback device 103 each receiving a title key from the server device 101 and encrypting the title key.

The encrypted content recording area 204 has recorded therein an encrypted content received by each of the portable playback device 102 and the playback device 103 from the server device 101.

The index information recording area 205 has recorded therein, as index information, information relating to a content recorded in the card 104, such as a title name, a resolution, a file format, and a copyright protection method. FIG. 4 shows an example of index information. According to the example shown in FIG. 4, the card 104 has recorded therein two types of contents, which have a title name "ABC" and have a different resolution, namely, a video content having a 320×240 pixel image size, which is called a QVGA (Quarter VGA) content and a video content having a 640×480 pixel image size, which is called a VGA (Video Graphics Array) content. Furthermore, the QVGA content is recorded in a "file format A" using a "copyright protection method X", and the VGA content is recorded in a "file format B" using a "copyright protection method Y". Here, the file format has a file extension such as an MPEG-4 (Moving Picture Experts Group-4) format and an MPEG-2 format. Also, as the copyright protection method, the following method may be used such as a CPRM (Content Protection for Recordable Media) method and an encryption method (such as a DES encryption method and an AES encryption method).

The purchase certificate recording area 206 has recorded therein a purchase certificate indicating that the content recorded in the card 104 has already been purchased. Furthermore, the purchase certificate contains information of a freely available content, in addition to a purchased content (that has been received and recorded into the card 104). FIG. 5 shows an example of a purchase certificate. According to the example shown in FIG. 5, a content having the title name "ABC" is recorded in a card identified by a card identifier "0x321 . . . ADE". It is found that different types of contents are permitted to be received (acquired). In this example, contents each having a different resolution are permitted to be acquired, namely a QVGA video content, a VGA video content, and an FHD video content (called full HD content having 1920×1080 pixel image size). In this example, a code "0x01" indicates that a content is permitted to be acquired, and a code "0x00" indicates that a content is not permitted to be acquired. The purchase certificate further contains destination information (URL: Uniform Resource Locator), on the assumption that a destination of the server device 101 differs for each resolution. Moreover, the purchase certificate has a signature appended thereto by the server device 101 in order to prevent the information contained therein from being tampered with. Here, a sign "Sig(P,Q)" represents a function for appending a signature to a message Q using a secret key P, a sign "SK" represents a secret key held in the server device 101. Note that a signature algorithm used here may be a general signature algorithm using an RSA encryption, an elliptic curve encryption, and so on, and description thereof is omitted here.

1.3 Structure of Portable Playback Device 102

Here, a detailed description is given of the structure of the portable playback device 102.

Figure 6:
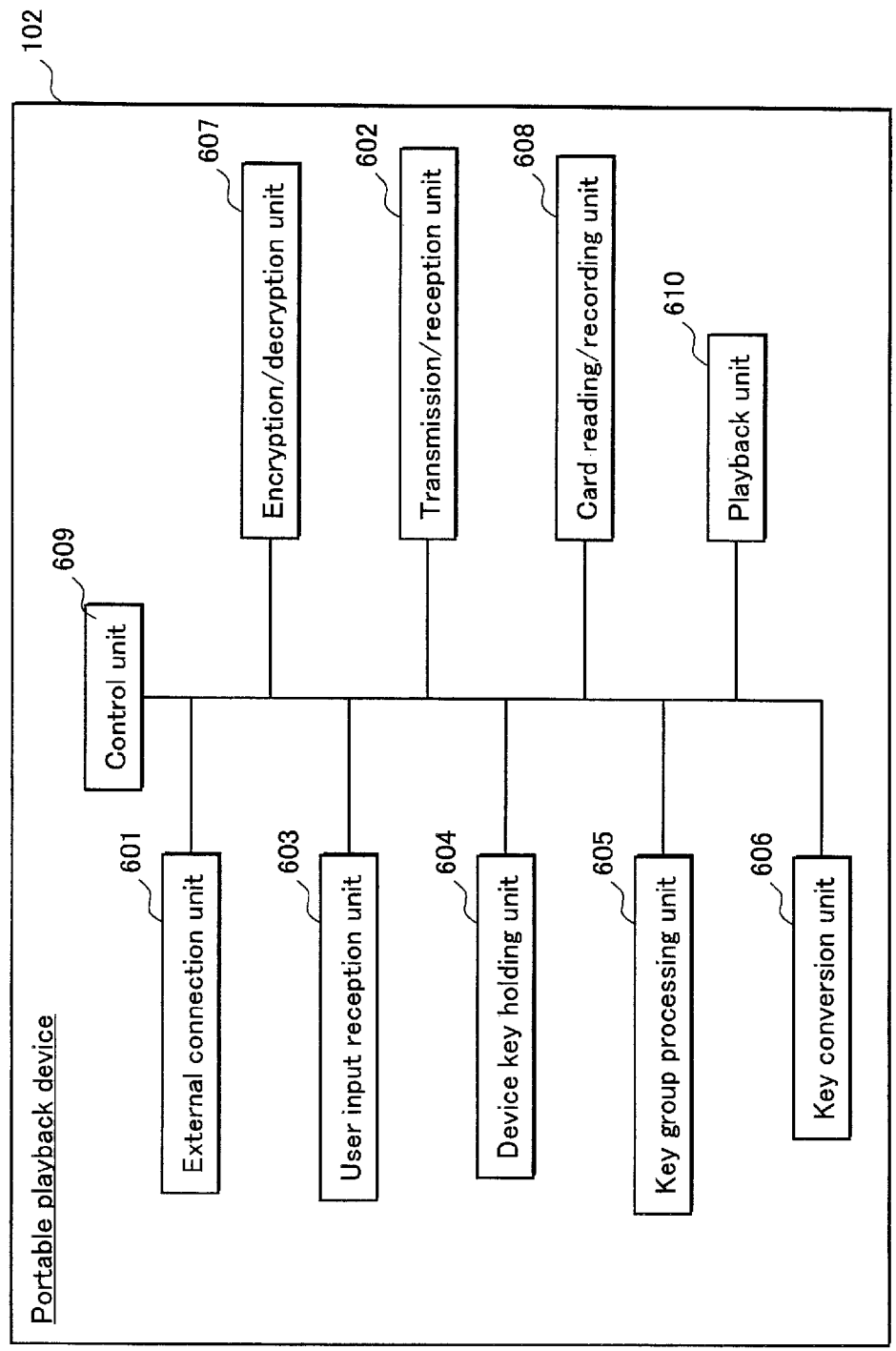
FIG. 6 is a block diagram showing the structure of a portable playback device 102.

The portable playback device 102 includes, as shown in FIG. 6, an external connection unit 601, a transmission/reception unit 602, a user input reception unit 603, a device key holding unit 604, a key group processing unit 605, a key conversion unit 606, an encryption/decryption unit 607, a card reading/recording unit 608, a control unit 609, and a playback unit 610.

The portable playback device 102 is composed of a microprocessor, a RAM, a ROM, a hard disk, and so on, which are not specifically illustrated. The RAM, the ROM, and the hard disk each have stored thereon a computer program. Functions of the portable playback device 102 are achieved by the microprocessor operating in accordance with the computer programs.

The functional blocks of the portable playback device 102 are each typically realized as an LSI (Large Scale Integration) that is an integrated circuit, which include the external connection unit 601, the transmission/reception unit 602, the user input reception unit 603, the device key holding unit 604, the key group processing unit 605, the key conversion unit 606, the encryption/decryption unit 607, the card reading/recording unit 608, the control unit 609, and the playback unit 610. These functional blocks may be separately integrated into one chip, or integrated into one chip including part or all of the functional blocks.

Also, although the LSI is used here, the LSI may be called an IC (Integrated Circuit), a system LSI, a super LSI, and an ultra LSI, depending on the integration degree.

Also, a method of forming integrated circuits is not limited to LSIs, and may be realized using a dedicated circuit or a general-purpose processor. Furthermore, it may be possible to use an FPGA (Field Programmable Gate Array) programmable after manufacturing LSIs or a reconfigurable processor in which connection and setting of a circuit cell inside an LSI can be reconfigured after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

Moreover, the functional blocks each may be realized as software or as a combination of an LSI and software. Such software may be tamper-resistant.

(1) External Connection Unit 601

The external connection unit 601 connects to the external server device 101 in order to receive a content.

(2) Transmission/Reception Unit 602

After the external connection unit 601 connects to the server device 101, the transmission/reception unit 602 transmits a request for a content to the server device 101, and receives the content from the server device 101.

(3) User Input Reception Unit 603

The user input reception unit 603 receives a request for a content, which is to be transmitted to the server device 101, from the user via the transmission/reception unit 602.

(4) Device Key Holding Unit 604

The device key holding unit 604 holds therein a device key for use in decrypting an encrypted media key included in a key group read from the card 104.

(5) Key Group Processing Unit 605

The key group processing unit 605 calculates a media key.

The key group processing unit 605 extracts, from the key group, an encrypted media key resulting from encryption using the device key held in the device key holding unit 604, and decrypts the extracted encrypted media key using the device key, thereby calculating a media key.

(6) Key Conversion Unit 606

The key conversion unit 606 converts the media key calculated by the key group processing unit 605 using the card identifier read from the card 104, thereby calculating a media unique key.

Here, key conversion may be performed with use of any general method. For example, key conversion may be performed by inputting a result, which is obtained by combining the media key and the card identifier, into a one-way function, and obtaining part or all of an output of the function as a media unique key.

(7) Encryption/Decryption Unit 607

The encryption/decryption unit 607 performs encryption of a title key and decryption of an encrypted title key and an encrypted content.

Specifically, the encryption/decryption unit 607 encrypts a title key, which has been received from the server device 101, using a media unique key generated by the key conversion unit 606, thereby calculating an encrypted title key. Also, the encryption/decryption unit 607 decrypts the encrypted title key using the media unique key to obtain a title key, and decrypts an encrypted content using the title key to obtain a plaintext content.

(8) Card Reading/Recording Unit 608

The card reading/recording unit 608 has an insertion unit (slot) into which the card 104 is insertable. With the card 104 inserted into the insertion unit, the card reading/recording unit 608 reads/writes various information from/into the card 104.

Specifically, the card reading/recording unit 608 reads the key group and the card identifier from the key group recording area 201 and the card identifier recording area 202 of the card 104, respectively. Also, the card reading/recording unit 608 records an encrypted title key, an encrypted content, index information, a purchase certificate, into the encrypted title key recording area 203, the encrypted content recording area 204, the index information recording area 205, and the purchase certificate recording area 206, respectively.

(9) Playback Unit 610

The playback unit 610 plays back a content recorded in the card 104 which is suitable for the attribute of the portable playback device 102.

Although not illustrated, the portable playback device 102 has a display unit such as a display. The display unit displays the content that is being played back.

(10) Control Unit 609

The control unit 609 manages and controls the above units (1) to (9) to realize connection to the server device 101, transmission of a content request, recording into the card 104, content playback, and so on.

1.4 Structure of Playback Device 103

Here, a detailed description is given of the structure of the playback device 103.

Figure 7:
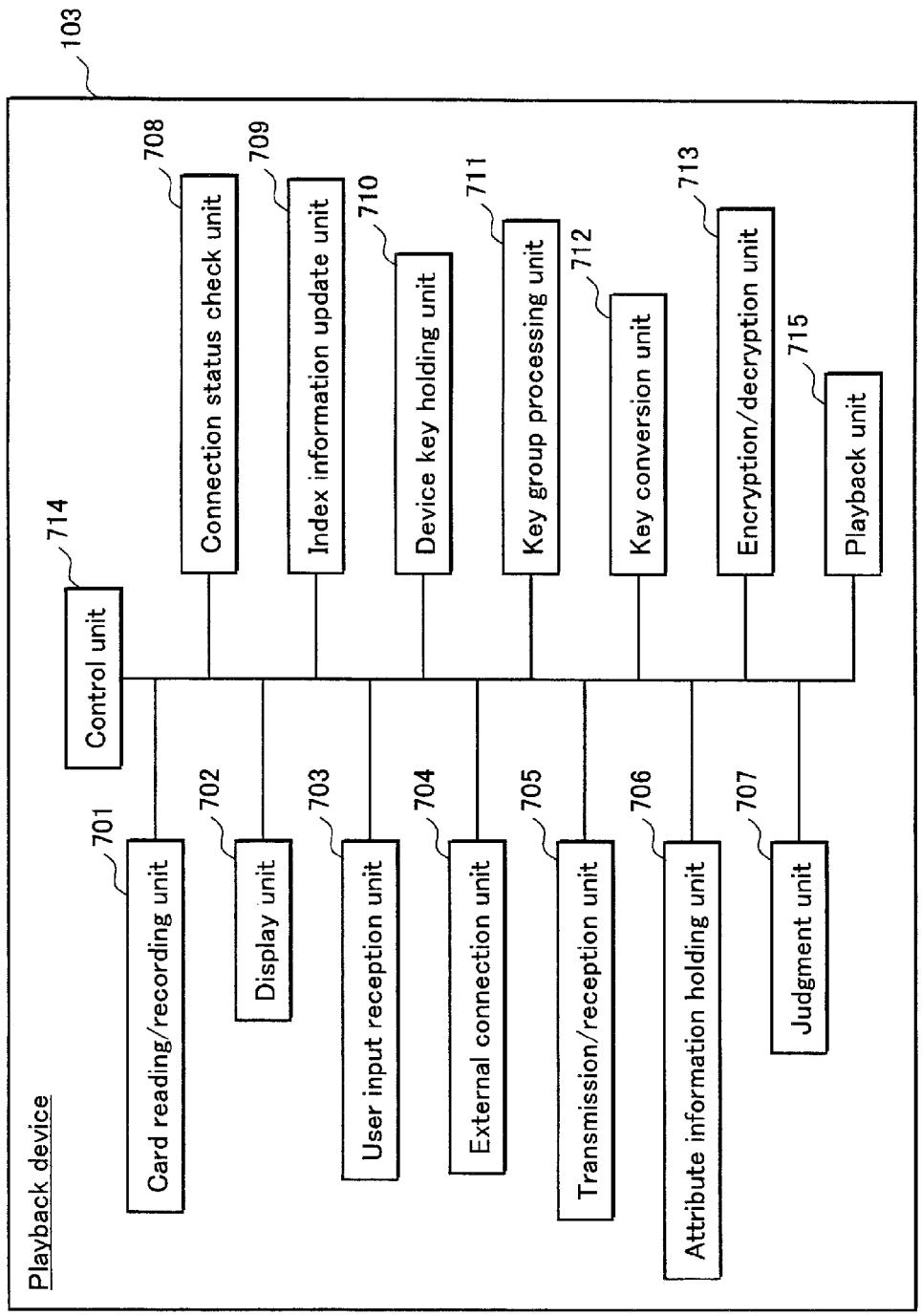
FIG. 7 is a block diagram showing the structure of a playback device 103.
Figure 8:
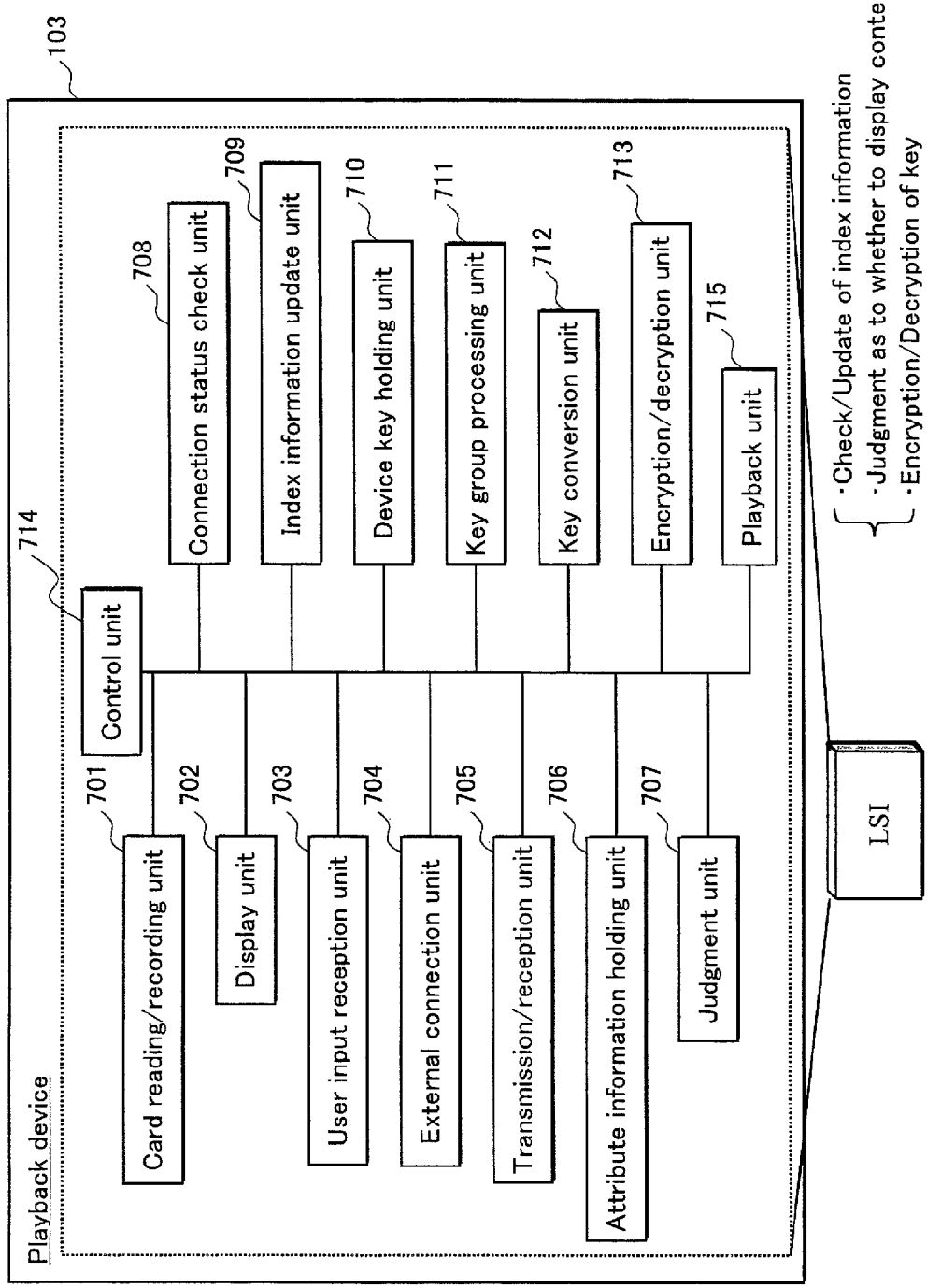
FIG. 8 shows the structure of an LSI realizing functions of the playback device 103.

The playback device 103 includes, as shown in FIG. 7, a card reading/recording unit 701, a display unit 702, a user input reception unit 703, an external connection unit 704, a transmission/reception unit 705, an attribute information holding unit 706, a judgment unit 707, a connection status check unit 708, an index information update unit 709, a device key holding unit 710, a key group processing unit 711, a key conversion unit 712, an encryption/decryption unit 713, a control unit 714, and a playback unit 715.

The playback device 103 is composed of a microprocessor, a RAM, a ROM, a hard disk, and so on, which are not specifically illustrated. The RAM, the ROM, and the hard disk each have stored thereon a computer program. Functions of the playback device 103 are achieved by the microprocessor operating in accordance with the computer programs.

The functional blocks of the playback device 103 are each typically realized as an LSI (Large Scale Integration) that is an integrated circuit, which include the card reading/recording unit 701, the display unit 702, the user input reception unit 703, the external connection unit 704, the transmission/reception unit 705, the attribute information holding unit 706, the judgment unit 707, the connection status check unit 708, the index information update unit 709, the device key holding unit 710, the key group processing unit 711, the key conversion unit 712, the encryption/decryption unit 713, the control unit 714, and the playback unit 715. These functional blocks may be separately integrated into one chip, or integrated into one chip including part or all of the functional blocks.

Also, although the LSI is used here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it may be possible to use an FPGA programmable after manufacturing LSIs or a reconfigurable processor in which connection and setting of a circuit cell inside an LSI can be reconfigured after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

Moreover, the functional blocks each may be realized as software or as a combination of an LSI and software. Such software may be tamper-resistant.

(1) Card Reading/Recording Unit 701

The card reading/recording unit 701 has an insertion unit (slot) into which the card 104 is insertable. With the card 104 inserted into the insertion unit, the card reading/recording unit 701 reads/writes various information from/into the card 104.

Specifically, the card reading/recording unit 701 reads a key group, the card identifier, index information, and a purchase certificate from the key group recording area 201, the card identifier recording area 202, the index information recording area 205, and the purchase certificate recording area 206 of the card 104, respectively. Also, the card reading/recording unit 701 records an encrypted title key, an encrypted content, and updated index information into the encrypted title key recording area 203, the encrypted content recording area 204, and the index information recording area 205, respectively.

(2) Display Unit 702

The display unit 702 displays a contents list of contents recorded in the card 104 based on the index information read from the card 104, and also displays a content that is being played back.

(3) User Input Reception Unit 703

The user input reception unit 703 receives a user's selection of a content among the contents list displayed on the display unit 702.

(4) External Connection Unit 704

The external connection unit 704 connects to the server device 101, based on a result of judgment performed by the judgment unit 707 as to whether a content suitable for the attribute of the playback device 103 is recorded in the card 104 based on the user's selection received by the user input reception unit 703 and the index information.

(5) Attribute Information Holding Unit 706

The attribute information holding unit 706 holds therein the attribute of the playback device 103 or an attribute of a display connected to the playback device 103 (such as a resolution, a file format, and a copyright protection method that are supported). According to the example shown in FIG. 9, the playback device 103 has an FHD display, and is compatible with the file formats A, B, and C, and copyright protection methods X, Y, and Z.

(6) Transmission/Reception Unit 705

The transmission/reception unit 705 transmits/receives information to/from the server device 101.

Specifically, after the external connection unit 704 connects to the server device 101, the transmission/reception unit 705 transmits a request for a content to the server device 101. Also, the transmission/reception unit 705 receives the content from the server device 101. Together with the request for the content, the transmission/reception unit 705 transmits the purchase certificate and the card identifier read from the card 104 and the attribute of the playback device 103.

(7) Judgment Unit 707

The judgment unit 707 judges whether to request the server device 101 for a content suitable for the playback device 103.

Specifically, the judgment unit 707 judges whether a content suitable for the attribute of the playback device 103 is recorded in the card 104, based on a result of the user's selection received by the user input reception unit 703 and the index information.

Also, before the display unit 702 displays the contents list, the judgment unit 707 judges whether to include the suitable content in the contents list which is to be displayed on the display unit 702, based on a result of check performed by the connection status check unit 708 as to whether the playback device 103 is externally connected. For example, as shown in an example in FIG. 10, in the case where only a QVGA content is recorded in the card 104 and the playback device 103 has a display capable of displaying FHD contents and is not externally connected, the judgment unit 707 judges to display the contents list excluding a content having a title name "AAA", or judges to display the contents list including the content having a title name "AAA" together with a warning message indicating "playback of this content is unsuitable" or the like.

Furthermore, the judgment unit 707 judges whether acquisition of the suitable content is permitted, based on the type of contents that are permitted to be acquired in the purchase certificate.

(8) Connection Status Check Unit 708

The connection status check unit 708 checks whether or not the playback device 103 is physically connected to an external device via a wired or wireless communication.

Specifically, the connection status check unit 708 checks whether the playback device 103 can access a predetermined URL. When checking that the playback device 103 can access the predetermined URL, the connection status check unit 708 judges that the playback device 103 is externally connected. When not checking that the playback device 103 can access the predetermined URL, the connection status check unit 708 judges that the playback device 103 is not externally connected.

(9) Index Information Update Unit 709

When the playback device 103 newly acquires a content suitable for the attribute of the playback device 103, the index information update unit 709 updates the index information. FIG. 10 shows an example of index information of a content having a title name "AAA". Assume, for example, that the user selects playback of this content having the title name "AAA". The user watches an FHD content having the title name "AAA" in the file format C and the copyright protection method Z, while the FHD content is being externally received. When reception of the FHD content completes, the FHD content is recorded into the card 104. In such a case, the index information update unit 709 updates the index information shown in FIG. 10 with index information shown in FIG. 11, and records the updated index information into the index information recording area 205 of the card 104 via the card reading/recording unit 701.

(10) Device Key Holding Unit 710

The device key holding unit 710 holds therein a device key for use in decrypting an encrypted media key included in a key group read from the card 104.

(11) Key Group Processing Unit 711

The key group processing unit 711 calculates a media key.

The key group processing unit 711 extracts, from the key group, an encrypted media key resulting from encryption using the device key held in the device key holding unit 710, and decrypts the extracted encrypted media key using the device key, thereby calculating a media key.

(12) Key Conversion Unit 712

The key conversion unit 712 converts the media key calculated by the key group processing unit 711 using the card identifier read from the card 104, thereby calculating a media unique key. Here, key conversion may be performed with use of any general method. For example, key conversion may be performed by inputting a result, which is obtained by combining the media key and the card identifier, into a one-way function, and obtaining part or all of an output of the function as a media unique key.

(13) Encryption/Decryption Unit 713

The encryption/decryption unit 713 performs encryption of a title key and decryption of an encrypted title key and an encrypted content.

Specifically, the encryption/decryption unit 713 encrypts a title key, which has been received from the server device 101, using a media unique key generated by the key conversion unit 712, thereby calculating an encrypted title key. Also, the encryption/decryption unit 713 decrypts the encrypted title key using the media unique key to obtain a title key, and decrypts an encrypted content using the title key to obtain a plaintext content.

(14) Playback Unit 715

The playback unit 715 plays back a content recorded in the card 104 which is suitable for the attribute of the playback device 103.

Note that the display unit 702 displays the content that is being played back.

(15) Control Unit 714

The control unit 714 manages and controls the above units (1) to (14) to realize connection to the server device 101, transmission of a content request, recording into the card 104, content playback, and so on.

1.5 Structure of Server Device 101

Here, a detailed description is given of the structure of the server device 101.

Figure 12:
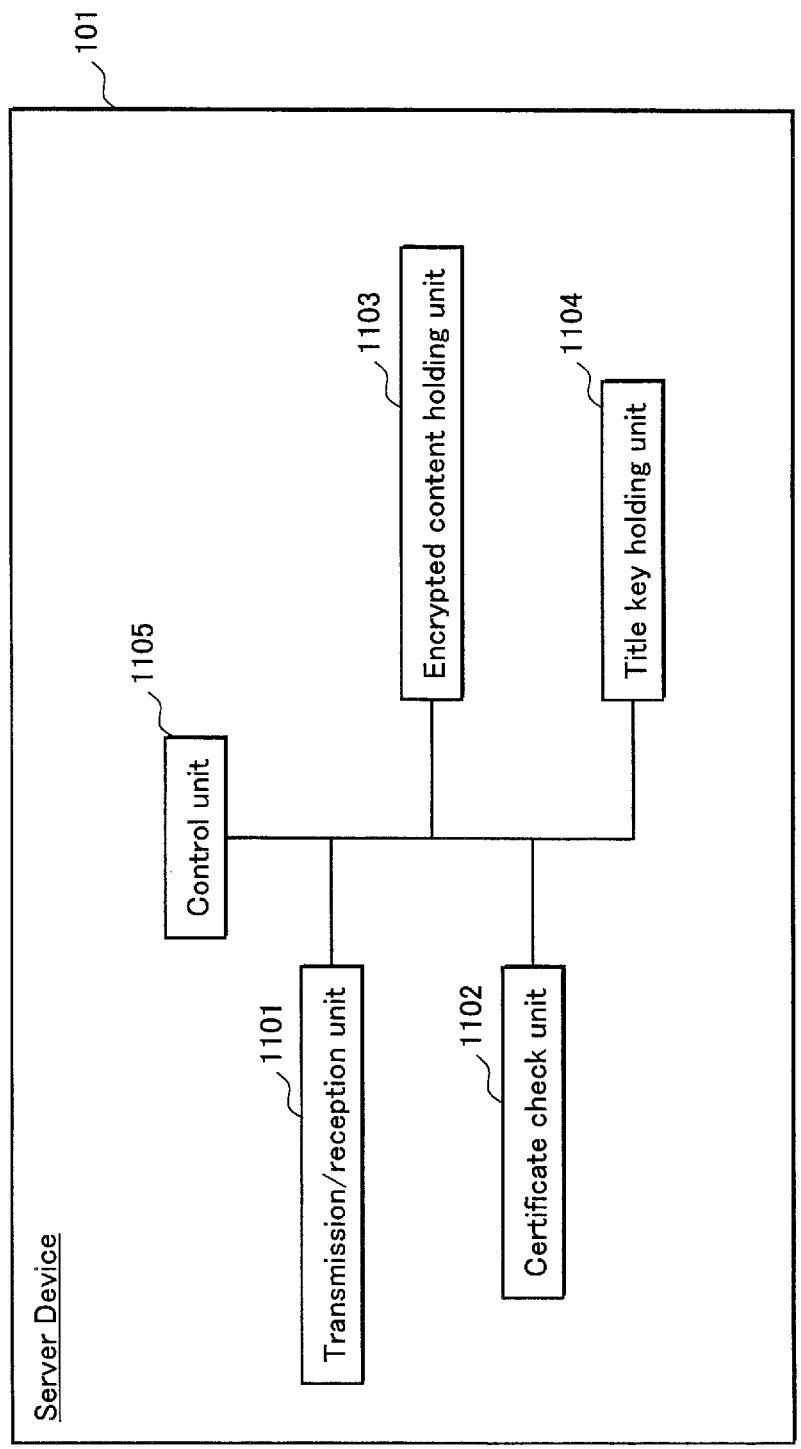
FIG. 12 shows the structure of a server device 101.

The server device 101 includes, as shown in FIG. 12, a transmission/reception unit 1101, a certificate check unit 1102, an encrypted content holding unit 1103, and a title key holding unit 1104.

The server device 101 is composed of a microprocessor, a RAM, a ROM, a hard disk, and so on, which are not specifically illustrated. The RAM, the ROM, and the hard disk each have stored thereon a computer program. Functions of the server device 101 are achieved by the microprocessor operating in accordance with the computer programs.

The functional blocks of the server device 101 are each typically realized as an LSI that is an integrated circuit, which include the transmission/reception unit 1101, the certificate check unit 1102, the encrypted content holding unit 1103, and the title key holding unit 1104. These functional blocks may be separately integrated into one chip, or integrated into one chip including part or all of the functional blocks.

Also, although the LSI is used here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it may be possible to use an FPGA programmable after manufacturing LSIs or a reconfigurable processor in which connection and setting of a circuit cell inside an LSI can be reconfigured after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

Moreover, the functional blocks each may be realized as software or as a combination of an LSI and software. Such software may be tamper-resistant.

(1) Transmission/Reception Unit 1101

The transmission/reception unit 1101 transmits/receives information to/from each of the portable playback device 102 and the playback device 103.

Specifically, the transmission/reception unit 1101 receives a request for a content from each of the portable playback device 102 and the playback device 103, and transmits an encrypted content and a title key to each of the portable playback device 102 and the playback device 103. Furthermore, the transmission/reception unit 1101 receives the purchase certificate and the card identifier from the playback device 103.

(2) Certificate Check Unit 1102

The certificate check unit 1102 judges whether to transmit a content to a device which has requested for the content.

Specifically, the certificate check unit 1102 checks whether the purchase certificate, which has been received from the playback device 103, has described therein that distribution of the content requested by the playback device 103 is permitted. Furthermore, the certificate check unit 1102 checks that the purchase certificate has not been tampered with and has been verified, by verifying a signature appended to the purchase certificate. Moreover, the certificate check unit 1102 checks that the request for the content has been received from a device into which a recording medium described in the purchase certificate is inserted, based on the card identifier described in the purchase certificate and the received card identifier. Only when confirming the authenticity of the request via all the above checks, the certificate check unit 1102 permits transmission of the content requested by the playback device 103.

(3) Title Key Holding Unit 1104

The title key holding unit 1104 holds therein a plurality of title keys.

(4) Encrypted Content Holding Unit 1103

The encrypted content holding unit 1103 holds therein, as shown in FIG. 13, a plurality of title names that are each in correspondence with a plurality of encrypted contents. The plurality of encrypted contents, which are in correspondence with each title name, are each identified by the title name. The plurality of encrypted contents are each obtained by encrypting a content generated in a format compatible with an attribute of a playback device, with use of a different title key.

For example, a title name "ABC" corresponds with each of encrypted contents 1, 2, and 3. The encrypted content 1 is obtained by encrypting a content having a resolution "QVGA" in the file format A and the copyright protection method X. The encrypted content 2 is obtained by encrypting a content having a resolution "VGA" in the file format B and the copyright protection method Y. The encrypted content 3 is obtained by encrypting a content having a resolution "FHD" in the file format A and the copyright protection method X.

When a request for a content is transmitted from the playback device 103, the server device 101 acquires an encrypted content suitable for the attribute of the playback device 103 among a plurality of encrypted contents corresponding to a title name described in the purchase certificate, and distributes the acquired encrypted content to the playback device 103.

(5) Control Unit 1105

The control unit 1105 manages and controls the above units (1) to (4) to realize check of a purchase certificate, transmission of a content requested by the playback device 103, transmission of a title key corresponding to the encrypted content, and so on.

1.6 Operations of Portable Playback Device 102

Figure 14:
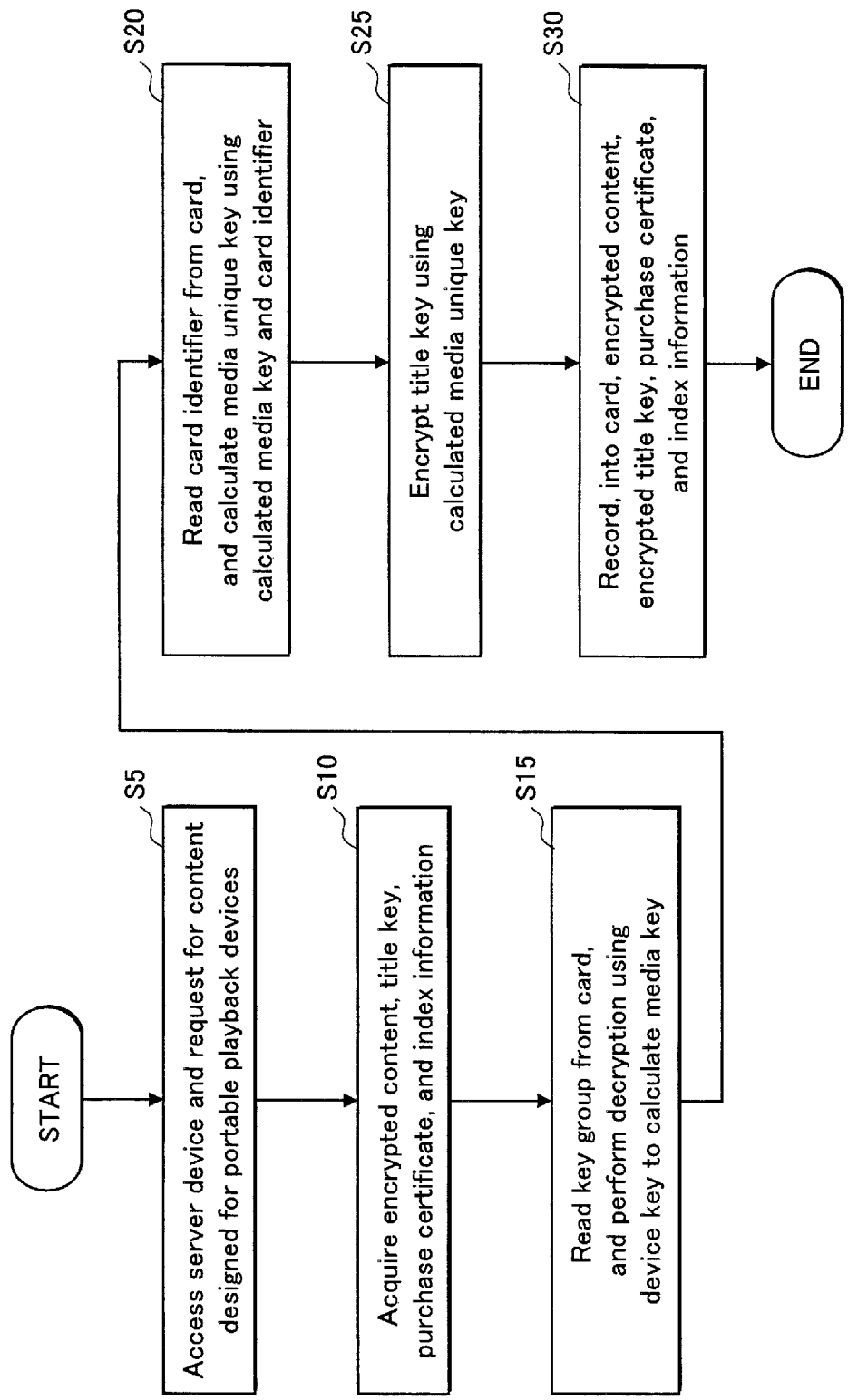
FIG. 14 is a flow chart showing the operations of the portable playback device 102.

The operations of the portable playback device 102 are described with reference to FIG. 14.

The playback device 102 connects to the server device 101 via the external connection unit 601, and requests for a content designed for portable playback devices via the transmission/reception unit 602 (Step S5).

The transmission/reception unit 602 acquires an encrypted content, a title key, a purchase certificate, and index information from the server device 101 (Step S10).

The key group processing unit 605 reads a key group from the key group recording area 201 of the card 104 via the card reading/recording unit 608, and performs decryption processing using a device key held in the device key holding unit 604, thereby calculating a media key (Step S15).

The key conversion unit 606 reads the card identifier from the card identifier recording area 202 of the card 104 via the card reading/recording unit 608, and calculates a media unique key using the read card identifier and the media key calculated by the key group processing unit 605 (Step S20).

The encryption/decryption unit 607 encrypts the received title key using the media unique key calculated by the key conversion unit 606, thereby calculating an encrypted title key (Step S25).

The card reading/recording unit 608 records, into the card 104, the received encrypted content, purchase certificate, and index information, and the calculated encrypted title key (Step S30).

1.7 Operations of Playback Device 103

Figure 15:
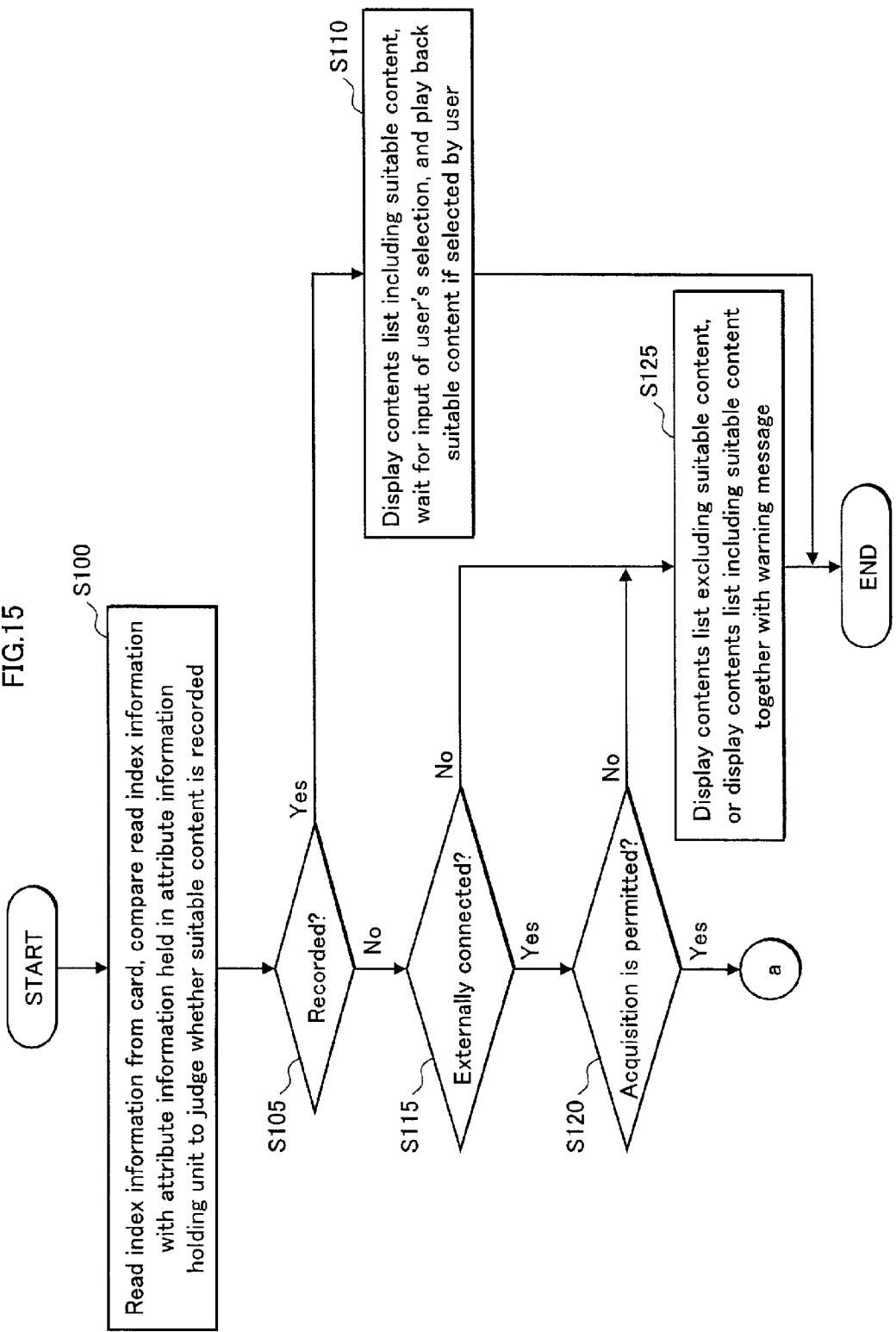
FIG. 15 is a flow chart showing the operations of the playback device 103, continuing to FIG. 16.
Figure 16:
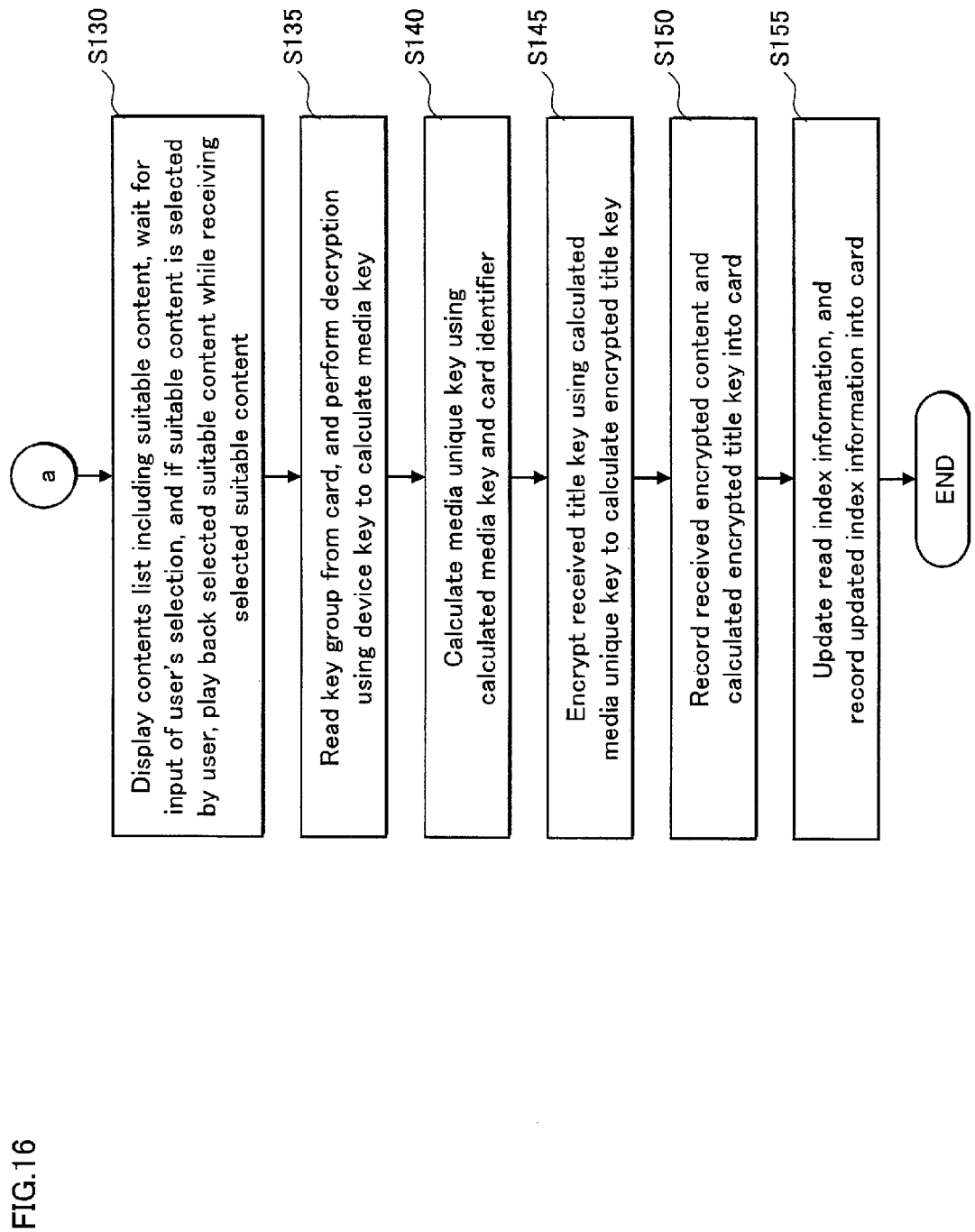
FIG. 16 is a flow chart showing the operations of the playback device 103, continuing from FIG. 15.

The operations of the playback device 103 are described with reference to FIG. 15 and FIG. 16.

The judgment unit 707 reads the index information from the index information recording area 205 of the inserted card 104 via the card reading/recording unit 701. The judgment unit 707 compares the read index information with the attribute information held in the attribute information holding unit 706 to judge whether a content suitable for the playback device 103 is recorded in the card 104 (Step S100).

When the judgment unit 707 judges that the suitable content is recorded (Step S105: Yes), the display unit 702 displays the contents list including the suitable content. The user input reception unit 703 waits for input of selection from the user. When the suitable content is selected by the user, the playback unit 715 plays back the selected content (Step S110).

When the judgment unit 707 judges that the suitable content is not recorded (Step S105: No), the judgment unit 707 further judges whether the playback device 103 is externally connected, based on a result of check performed by the connection status check unit 708 (Step S115).

When the judgment unit 707 judges that the playback device 103 is not externally connected (Step S115: No), the display unit 702 displays the contents list excluding the suitable content, or displays the contents list including the suitable content together with a warning message (Step S125).

When the judgment unit 707 judges that the playback device 103 is externally connected (Step S115: Yes), the judgment unit 707 reads the purchase certificate from the purchase certificate recording area 206 of the card 104 via the card reading/recording unit 701, and judges whether acquisition of the suitable content generated in the format compatible with the attribute of the playback device 103 is permitted, based on acquisition permission information contained in the read purchase certificate (Step S120).

When the judgment unit 707 judges that acquisition of the suitable content is not permitted (Step S120: No), the processing in Step S125 is performed.

When the judgment unit 707 judges that acquisition of the suitable content is permitted (Step S120: Yes), the display unit 702 displays the contents list including the suitable content. The user input reception unit 703 waits for input of selection from the user. When the suitable content is selected by the user, the playback unit 715 plays back the selected suitable content while the transmission/reception unit 705 receives the selected suitable content (Step S130). Note that when the user selects a content, the playback device 103 transmits a request for the selected content to the server device 101, together with the purchase certificate and the card identifier. When the server device 101 succeeds in verification or the like, the playback device 103 receives the selected content.

When reception of the content completes, the key group processing unit 711 reads the key group from the key group recording area 201 of the card 104, and performs decryption processing using the device key held in the device key holding unit 710, thereby calculating a media key (Step S135).

The key conversion unit 712 calculates a media unique key, using the media key calculated by the key group processing unit 711 and the card identifier read from the card identifier recording area 202 of the card 104 (Step S140).

The encryption/decryption unit 713 encrypts the received title key using the media unique key calculated by the key conversion unit 712, thereby calculating an encrypted title key (Step S145).

The control unit 714 records the received encrypted content and the encrypted title key into the card 104 card via the card reading/recording unit 701 (Step S150). When the recording completes, the index information update unit 709 updates the read index information, and records the updated index information into the card 104 via the card reading/recording unit 701 (Step S155).

1.8 Operations of Server Device 101

The operations of the server device 101 are described with reference to FIG. 17.

Firstly, the control unit 1105 receives a request for a content, a purchase certificate, and a card identifier from the playback device 103 via the transmission/reception unit 1105 (Step S200).

The certificate check unit 1102 judges whether distribution of the content requested by the playback device 103 is permitted in the purchase certificate (Step S205).

When judging that distribution of the requested content is permitted (Step S205: Yes), the certificate check unit 1102 performs signature verification (Step S210). Specifically, the certificate check unit 1102 verifies whether the purchase certificate has not been tampered with and has been verified, and verifies whether the received card identifier matches a card identifier contained in the purchase certificate. When the purchase certificate has been verified and the card identifiers match each other as a result of the verifications, the certificate check unit 1102 judges that the signature verification has succeeded. Otherwise, the certificate check unit 1102 judges that the signature verification has failed.

When the certificate check unit 1102 judges that the signature verification has succeeded (Step S210: Yes), the control unit 1105 reads an encrypted content and a title key from the encrypted content holding unit 1103 and the title key holding unit 1104, respectively, and the transmission/reception unit 1101 transmits the read encrypted content and title key (Step S220).

When the certificate check unit 1102 judges that distribution of the requested content is not permitted (Step S205: No), or when the signature verification has failed (Step S210: No), the transmission/reception unit 1101 notifies the playback device 103 of that distribution of the requested content is not permitted (Step S215).

2. Embodiment 2

2.1 Structure of Content Distribution System 1A

A content distribution system 1A has additional functions, along with the functions of content distribution system 1 described in the above embodiment 1.

The additional functions are described with the drawings.

Figure 18:
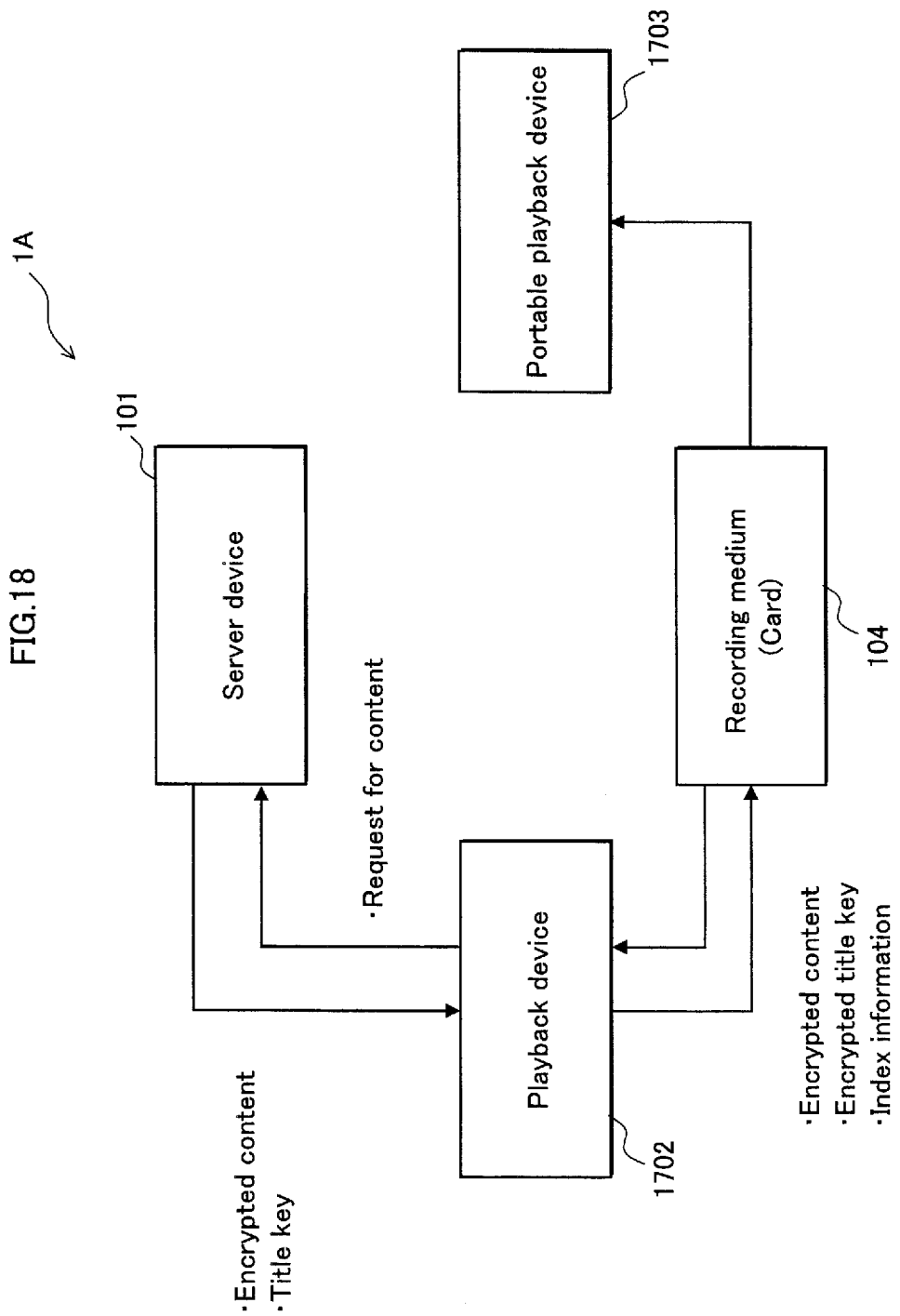
FIG. 18 shows the structure of a content distribution system 1A.

The content distribution system 1A includes, as shown in FIG. 18, a server device 101, a playback device 1702, a portable playback device 1703, and a recording medium 104 (hereinafter, referred to as "card 104"). Note that the server device 101 and the card 104 in the embodiment 2 have the same structure as those in the embodiment 1, and accordingly detailed descriptions thereof are omitted here.

When the card 104 is inserted into the playback device 1702 by the user, the playback device 1702 connects to the server device 101 to purchase a content, and records the purchased content into the card 104. The user owning the playback device 1702 watches the received content. The details of the playback device 1702 are described in later.

When the card 104 is inserted into the portable playback device 1703 by the user, the portable playback device 1703 checks an attribute of each of contents relating to playback recorded in the card 104 and an attribute of the portable playback device 1703 relating to content playback, and selects a suitable content for playback. The details of the portable playback device 1703 are described in later.

2.2 Structure of Playback Device 1702

Here, a detailed description is given of the structure of the playback device 1702.

Figure 19:
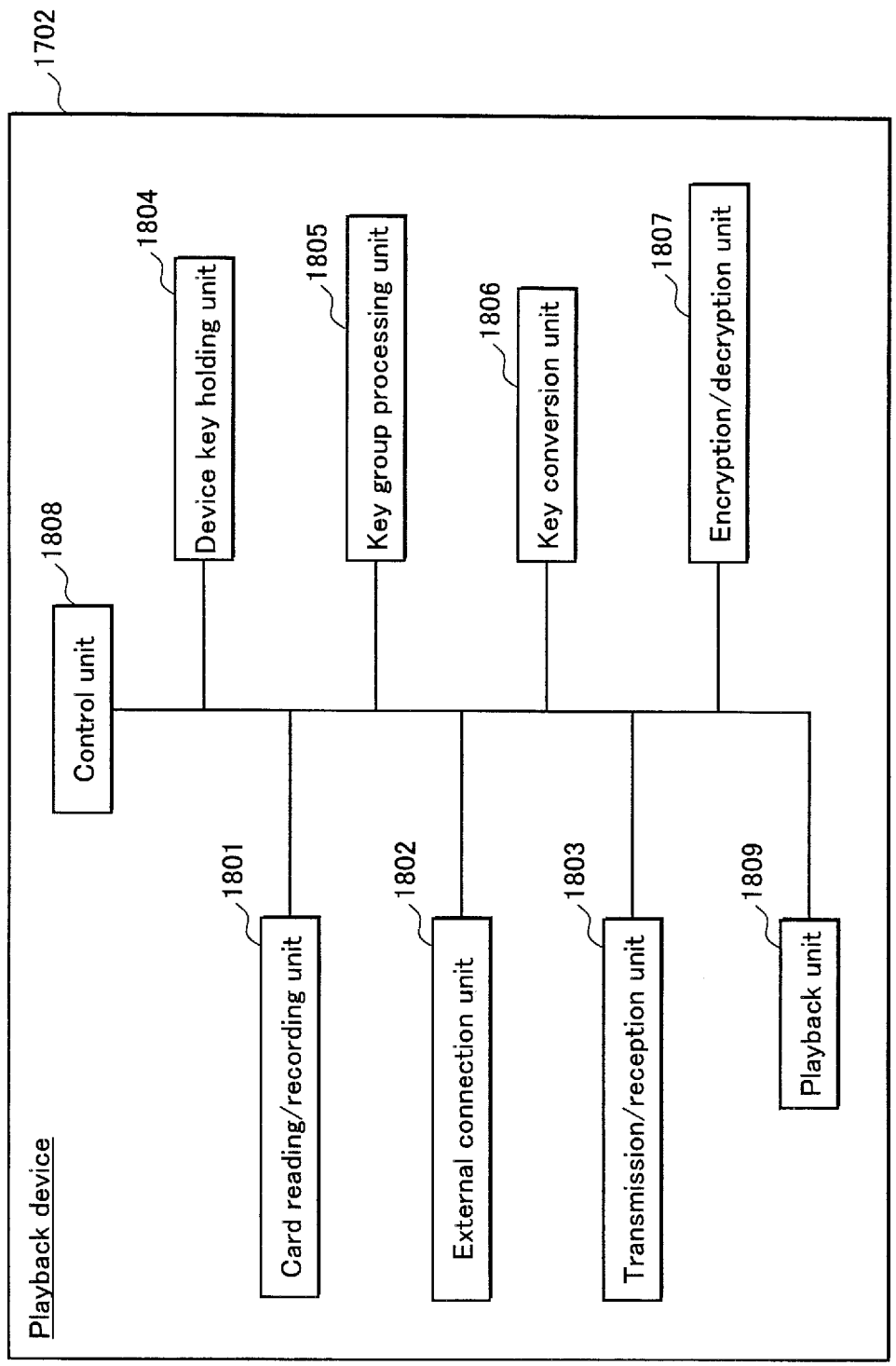
FIG. 19 is a block diagram showing the structure of a playback device 1702.

The playback device 1702 includes, as shown in FIG. 19, a card reading/recording unit 1801, an external connection unit 1802, a transmission/reception unit 1803, a device key holding unit 1804, a key group processing unit 1805, a key conversion unit 1806, an encryption/decryption unit 1807, a control unit 1808, and a playback unit 1809.

The playback device 1702 is composed of a microprocessor, a RAM, a ROM, a hard disk, and so on, which are not specifically illustrated. The RAM, the ROM, and the hard disk each have stored thereon a computer program. Functions of the playback device 1702 are achieved by the microprocessor operating in accordance with the computer programs.

The functional blocks of the playback device 1702 are each typically realized as an LSI that is an integrated circuit, which include the card reading/recording unit 1801, the external connection unit 1802, the transmission/reception unit 1803, the device key holding unit 1804, the key group processing unit 1805, the key conversion unit 1806, the encryption/decryption unit 1807, the control unit 1808, and the playback unit 1809. These functional blocks may be separately integrated into one chip, or integrated into one chip including part or all of the functional blocks.

Also, although the LSI is used here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it may be possible to use an FPGA programmable after manufacturing LSIs or a reconfigurable processor in which connection and setting of a circuit cell inside an LSI can be reconfigured after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

Moreover, the functional blocks each may be realized as software or as a combination of an LSI and software. Such software may be tamper-resistant.

(1) Card Reading/Recording Unit 1801

The card reading/recording unit 1801 has an insertion unit (slot) into which the card 104 is insertable. With the card 104 inserted into the insertion unit, the card reading/recording unit 1801 reads/writes various information from/into the card 104.

Specifically, the card reading/recording unit 1801 reads the key group and the card identifier from the key group recording area 201 and the card identifier recording area 202 of the card 104, respectively. Also, the card reading/recording unit 1801 records an encrypted title key, an encrypted content, and index information into the encrypted title key recording area 203, the encrypted content recording area 204, and the index information recording area 205, respectively.

Here, FIG. 20 shows an example of index information. Also, FIG. 21A shows an example of an encrypted content, and FIG. 21B shows an example of an encrypted title key.

According to the example shown in FIG. 20, three types of contents are recorded in the card 104, which are each identified by the title name "AAA" and differ from each other in resolution (QVGA, VGA, and FHD). Also, according to the example shown in FIG. 21A, three types of encrypted contents each having a different resolution are recorded in the encrypted content recording area 204 of the card 104. According to the example shown in FIG. 21B, encrypted title keys, which are in one-to-one correspondence with the three types of encrypted contents, are recorded in the encrypted title key recording area 203 of the card 104.

According to FIG. 20, FIG. 21A, and FIG. 21B, it is found that the QVGA encrypted content 1 is in the file format A, the VGA encrypted content 2 is in the file format B, and the FHD encrypted content 3 is in the file format C. Furthermore, it is found that the QVGA encrypted content 1 and the encrypted title key 1 are recorded in the copyright protection method X, the VGA encrypted content 2 and the encrypted title key 2 are recorded in the copyright protection method Y, and the FHD encrypted content 3 and the encrypted title key 3 are recorded in the copyright protection method Z.

(2) External Connection Unit 1802

The external connection unit 1802 connects to the external server device 101 in order to receive a content.

(3) Transmission/Reception Unit 1803

After the external connection unit 1802 connects to the server device 101, the transmission/reception unit 1803 transmits a request for a content to the server device 101, and receives the content from the server device 101.

(4) Device Key Holding Unit 1804

The device key holding unit 1804 holds therein a device key for use in decrypting an encrypted media key included in a key group read from the card 104.

(5) Key Group Processing Unit 1805

The key group processing unit 1805 calculates a media key.

The key group processing unit 1805 extracts, from the key group, an encrypted media key resulting from encryption using the device key held in the device key holding unit 1804, and decrypts the extracted encrypted media key using the device key, thereby calculating a media key.

(6) Key Conversion Unit 1806

The key conversion unit 1806 converts the media key calculated by the key group processing unit 1805 using the card identifier read from the card 104, thereby calculating a media unique key. Here, key conversion may be performed with use of any general method. For example, key conversion may be performed by inputting a result, which is obtained by combining the media key and the card identifier, into a one-way function, and obtaining part or all of an output of the function as a media unique key.

(7) Encryption/Decryption Unit 1807

The encryption/decryption unit 1807 performs encryption of a title key and decryption of an encrypted title key and an encrypted content.

Specifically, the encryption/decryption unit 1807 encrypts a title key, which has been received from the server device 101, using a media unique key generated by the key conversion unit 1806, thereby calculating an encrypted title key. Also, the encryption/decryption unit 1807 decrypts the encrypted title key using the media unique key to obtain a title key, and decrypts an encrypted content using the title key to obtain a plaintext content.

(8) Playback Unit 1809

The playback unit 1809 plays back a content recorded in the card 104 which is suitable for the attribute of the playback device 1702.

Although not illustrated, the playback device 1702 has a display unit such as a display. The display unit displays the content that is being played back.

(9) Control Unit 1808

The control unit 1808 manages and controls the above units (1) to (8) to realize connection to the server device 101, transmission of a content request, recording into the card 104, playback of a content, and so on.

2.3 Structure of Portable Playback Device 1703

Here, a detailed description is given of the structure of the portable playback device 1703.

Figure 22:
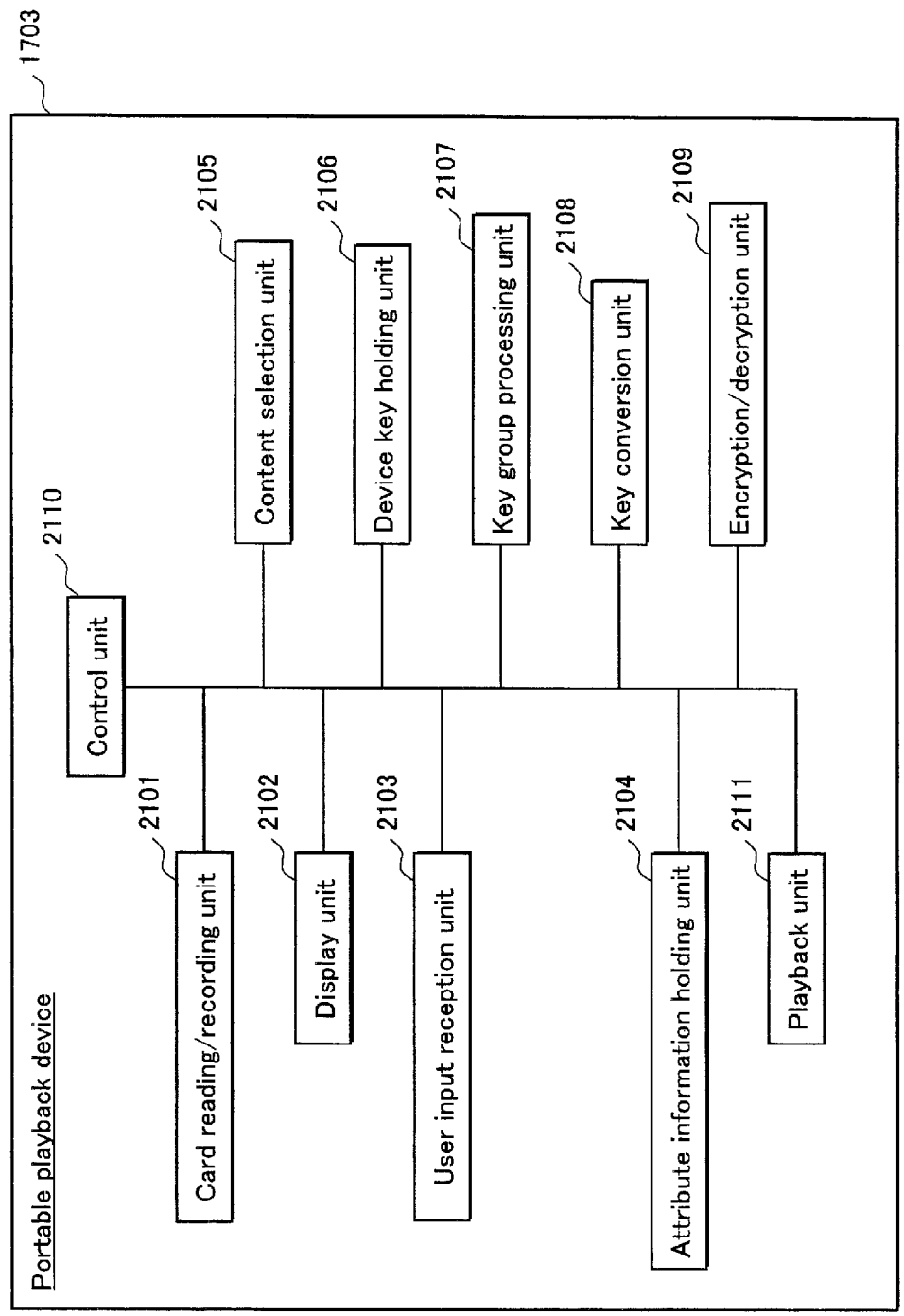
FIG. 22 is a block diagram showing the structure of a portable playback device 1703.

The portable playback device 1703 includes, as shown in FIG. 22, a card reading/recording unit 2101, a display unit 2102, a user input reception unit 2103, an attribute information holding unit 2104, a content selection unit 2105, a device key holding unit 2106, a key group processing unit 2107, a key conversion unit 2108, an encryption/decryption unit 2109, a control unit 2110, and a playback unit 2111.

The portable playback device 1703 is composed of a microprocessor, a RAM, a ROM, a hard disk, and so on, which are not specifically illustrated. The RAM, the ROM, and the hard disk each have stored thereon a computer program. Functions of the portable playback device 1703 are achieved by the microprocessor operating in accordance with the computer programs.

The functional blocks of the portable playback device 1703 are each typically realized as an LSI that is an integrated circuit, which include the card reading/recording unit 2101, the display unit 2102, the user input reception unit 2103, the attribute information holding unit 2104, the content selection unit 2105, the device key holding unit 2106, the key group processing unit 2107, the key conversion unit 2108, the encryption/decryption unit 2109, the control unit 2110, and the playback unit 2111. These functional blocks may be separately integrated into one chip, or integrated into one chip including part or all of the functional blocks.

Also, although the LSI is used here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it may be possible to use an FPGA programmable after manufacturing LSIs or a reconfigurable processor in which connection and setting of a circuit cell inside an LSI can be reconfigured after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

Moreover, the functional blocks each may be realized as software or as a combination of an LSI and software. Such software may be tamper-resistant.

(1) Card Reading/Recording Unit 2101

The card reading/recording unit 2101 reads the key group, the card identifier, and the index information from the key group recording area 201, the card identifier recording area 202, and the index information recording area 205, respectively.

(2) Display Unit 2102

The display unit 2102 displays a contents list of contents recorded in the card 104 based on the index information read from the card 104, and also displays a content that is being played back.

(3) User Input Reception Unit 2103

The user input reception unit 2103 receives a user's selection of a content among the contents list displayed on the display unit 2102.

(4) Attribute Information Holding Unit 2104

The attribute information holding unit 2104 holds therein the attribute of the portable playback device 1703 (such as a resolution, a file format, and a copyright protection method that are supported by the portable playback device 1703).

According to the example shown in FIG. 23, the portable playback device 1703 has a QVGA display, and is compatible with the file format A and the copyright protection method X.

(5) Content Selection Unit 2105

The content selection unit 2105 selects a suitable content among contents recorded in the card 104, based on information held in the attribute information holding unit 2104. In the example of attribute information shown in FIG. 23 and the examples of contents recorded in the card 104 shown in FIG. 20, FIG. 21A, and FIG. 21B, the content selection unit 2105 selects the QVGA encrypted content 1 recorded in the file format A and the copyright protection method X.

(6) Device Key Holding Unit 2106

The device key holding unit 2106 holds therein a device key for use in decrypting an encrypted media key included in a key group read from the card 104.

(7) Key Group Processing Unit 2107

The key group processing unit 2107 extracts an encrypted media key from the key group, and decrypts the encrypted media key using the device key held in the device key holding unit 2106, thereby calculating a media key.

(8) Key Conversion Unit 2108

The key conversion unit 2108 converts the media key calculated by the key group processing unit 2107 using the card identifier read from the card 104, thereby calculating a media unique key. Here, key conversion may be performed with use of any general method. For example, key conversion may be performed by inputting a result, which is obtained by combining the media key and the card identifier, into a one-way function, and obtaining part or all of an output of the function as a media unique key.

(9) Encryption/Decryption Unit 2109

The encryption/decryption unit 2109 decrypts an encrypted media key using a device key to calculate a media key, and decrypts an encrypted title key using a calculated media key to calculate a title key. Also, the encryption/decryption unit 2109 decrypts an encrypted content using the title key to obtain a plaintext content.

(10) Playback Unit 2111

The playback unit 2111 plays back a content recorded in the card 104 which is suitable for the attribute of the portable playback device 1703.

The display unit 2102 displays the content that is being played back.

(11) Control Unit 2110

The control unit 2110 manages and controls the above units (1) to (10) to realize content selection, content playback, and so on.

2.4 Operations of Playback Device 1702

Figure 24:
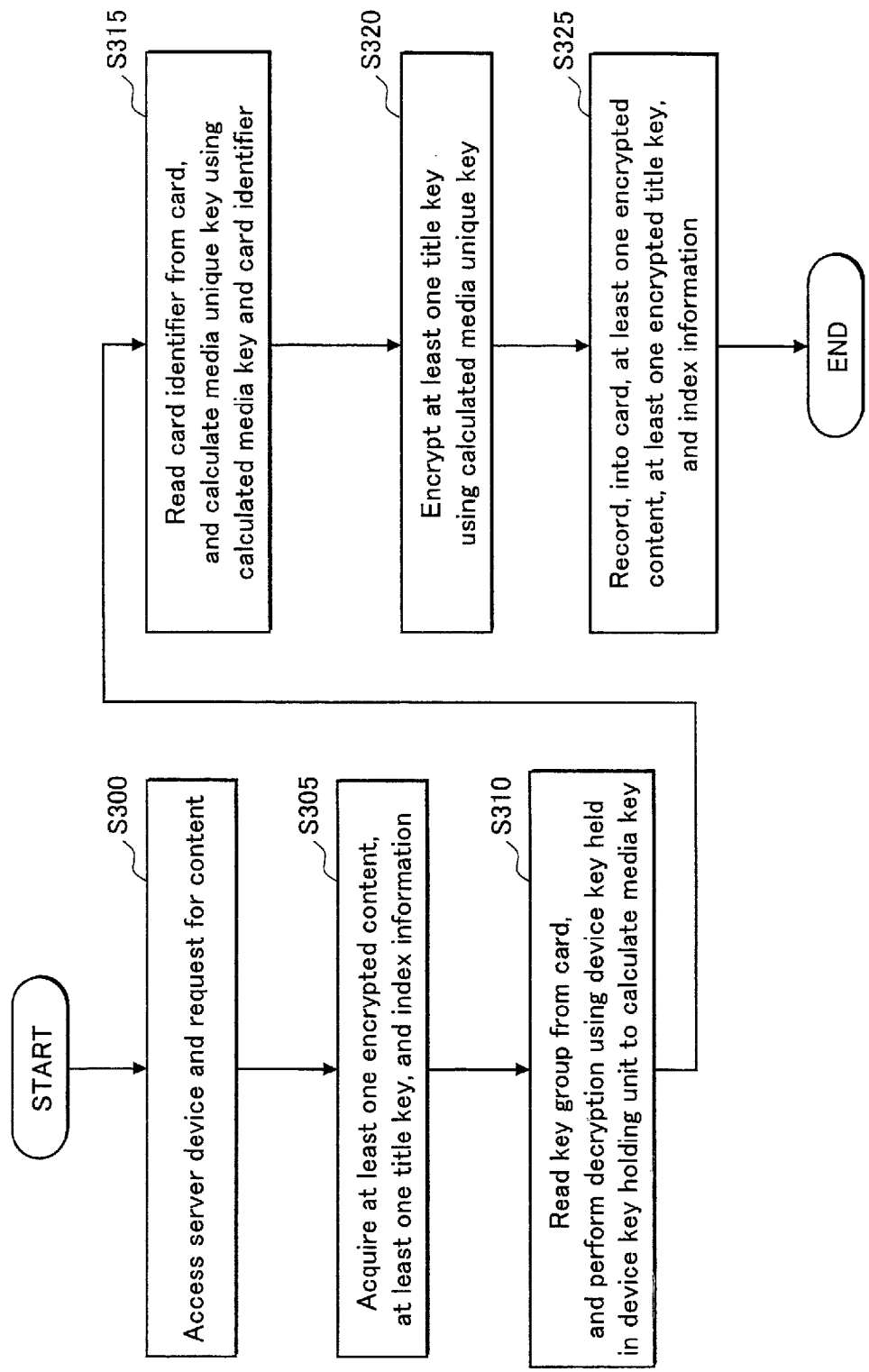
FIG. 24 is a flow chart showing the operations of the playback device 1702.

The operations of the playback device 1702 are described with reference to FIG. 24.

The playback device 1702 connects to the server device 101 via the external connection unit 1802, and requests for a content via the transmission/reception unit 1803 (Step S300).

The transmission/reception unit 1803 receives (acquires) at least one encrypted content, at least one title key, and index information (Step S305). Here, the at least one encrypted content is in one-to-one correspondence with the at least one title key.

The key group processing unit 1805 reads a key group from the key group recording area 201 of the card 104 via the card reading/recording unit 1801, and performs decryption processing using a device key held in the device key holding unit 1804, thereby calculating a media key (Step S310).

The key conversion unit 1806 converts the media key calculated by the key group processing unit 1805 using the card identifier read from the card identifier recording area 202 of the card 104, thereby calculating a media unique key (Step S315).

The encryption/decryption unit 1807 encrypts the received at least one title key using the calculated media unique key, thereby calculating at least one encrypted title key (Step S320).

The card reading/recording unit 1801 records, into the card 104, the received at least one encrypted content, the received index information, and the calculated at least one encrypted title key (Step S325). Here, the card reading/recording unit 1801 records, into the card 104, the at least one encrypted content in one-to-one correspondence with the at least one encrypted title key resulting from encryption of the at least one title key, which is in one-to-one correspondence with the at least one encrypted content. For example, the correspondence is made based on resolution, as shown in FIG. 21A and FIG. 21B.

2.5 Operations of Portable Playback Device 1703

Figure 25:
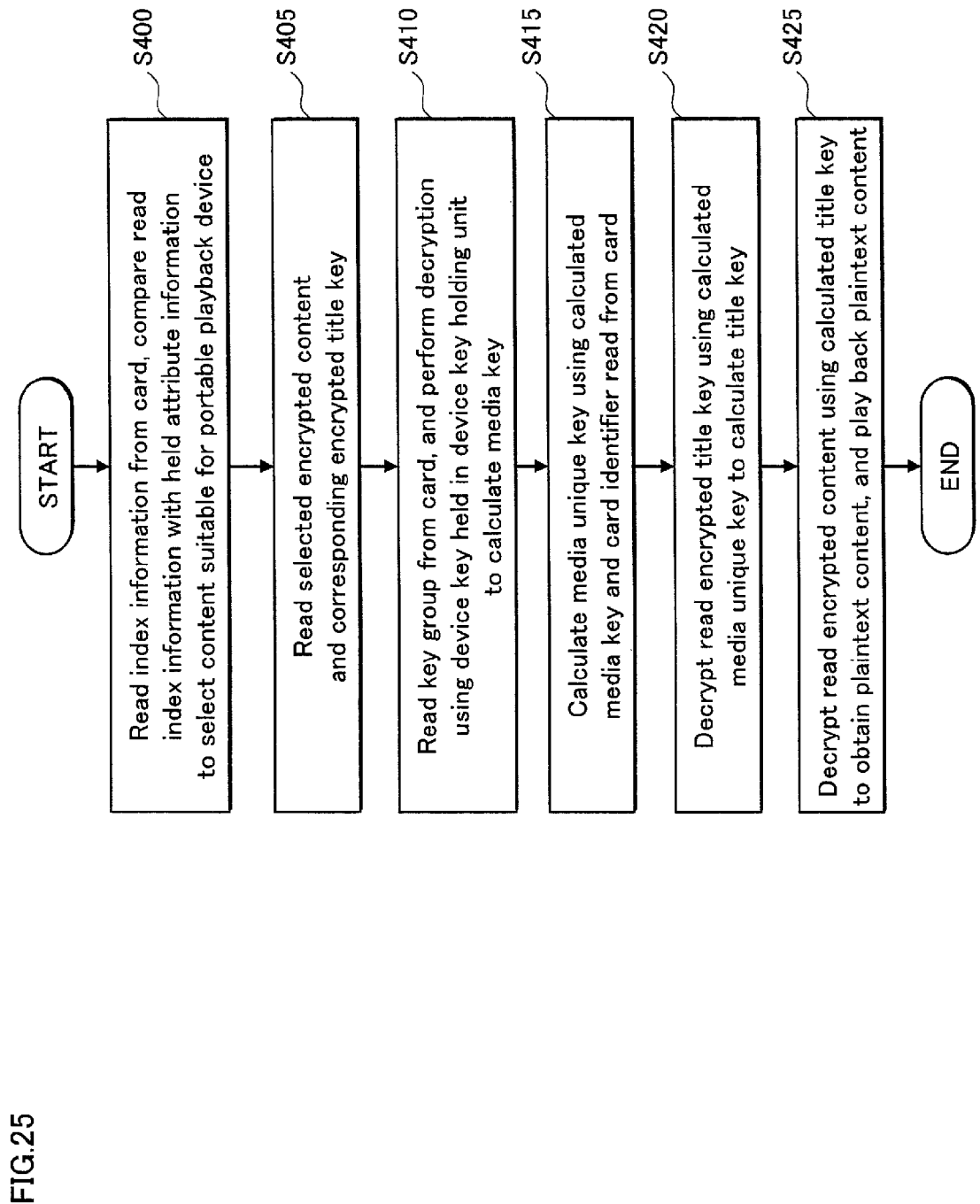
FIG. 25 is a flow chart showing the operations of the portable playback device 1703.

The operations of the portable playback device 1703 are described with reference to FIG. 25.

The content selection unit 2105 reads index information from the index information recording area 205 of the card 104 inserted into the portable playback device 1703 via the card reading/recording unit 2101. The content selection unit 2105 compares the read index information with the attribute information held in the attribute information holding unit 2104 to select a content suitable for the portable playback device 1703 (Step S400).

Based on the selected content, the content selection unit 2105 reads an encrypted content and an encrypted title key corresponding to the encrypted content, from the encrypted content recording area 204 and the encrypted title key recording area 203 of the card 104, respectively via the card reading/recording unit 2101 (Step S405).

The key group processing unit 2107 reads the key group from the key group recording area 201 of the card 104 via the card reading/recording unit 2101, and performs decryption processing using a device key held in the device key holding unit 2106, thereby calculating a media key (Step S410).

The key conversion unit 2108 calculates a media unique key using the calculated media key and the card identifier read from the card identifier recording area 202 of the card 104 (Step S415).

The encryption/decryption unit 2109 decrypts the read encrypted title key using the calculated media unique key, thereby calculating a title key (Step S420).

The encryption/decryption unit 2109 decrypts the read encrypted content using the calculated title key, thereby obtaining a plaintext content. The playback unit 2111 plays back the decrypted plaintext content (Step S425).

3. Embodiment 3

3.1 Structure of Content Distribution System 1B

Figure 26:
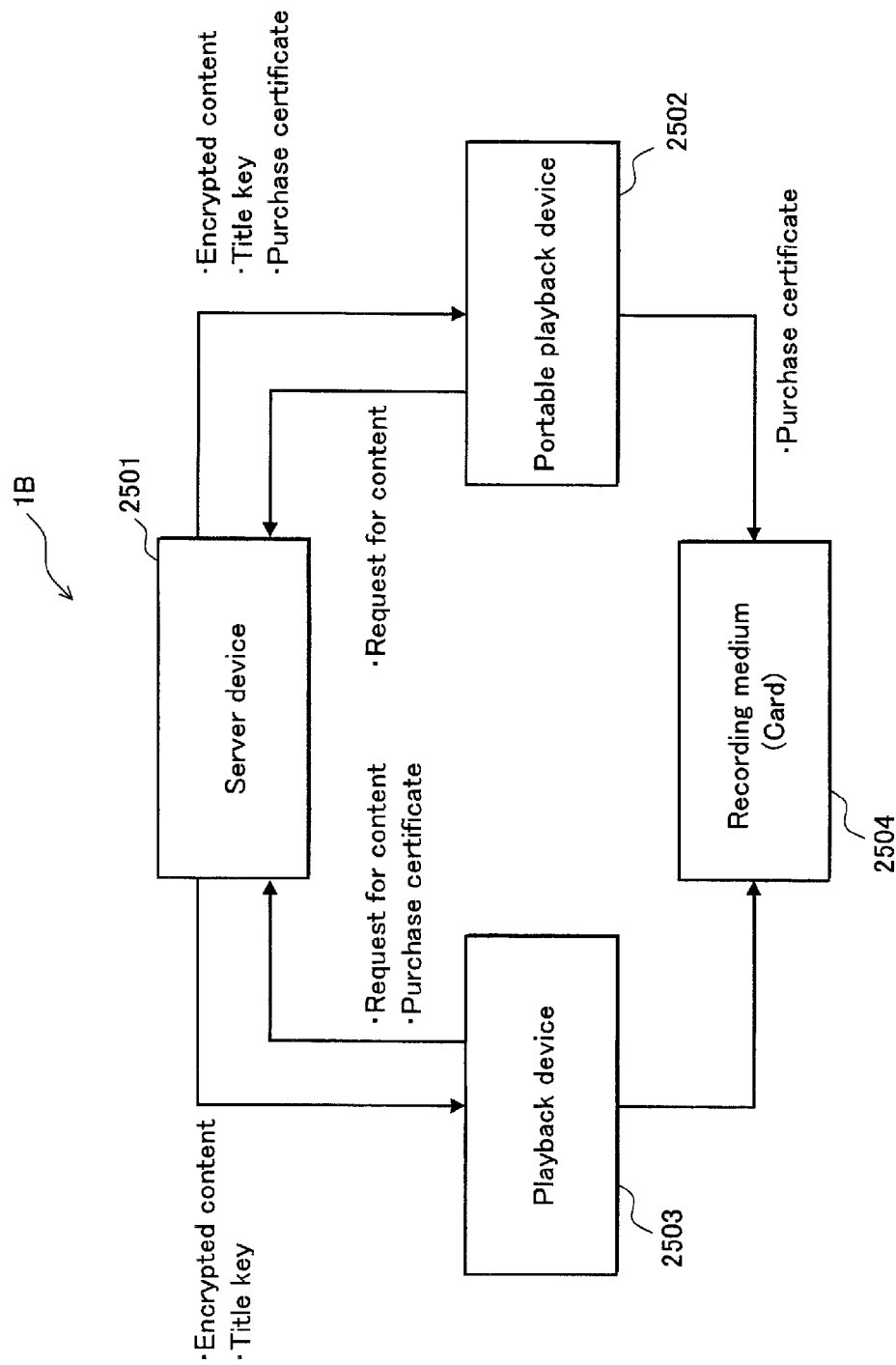
FIG. 26 shows the structure of a content distribution system 1B.

A content distribution system 1B includes, as shown in FIG. 26, a server device 2501, a portable playback device 2502, a playback device 2503, and a recording medium 2504 (hereinafter, referred to as "card 2504").

In the content distribution system 1 according to the above embodiment 1, the recording medium (card) 104 has recorded therein an encrypted content, an encrypted title key, index information, and a purchase certificate. Different from this, in the content distribution system 1B according to the embodiment 3, the card 2504 has recorded therein only a purchase certificate.

When receiving a request for a content from the portable playback device 2502 or the playback device 2503, the server device 2501 verifies validity or authenticity of the request. When judging that distribution of the content is permitted as a result of the verification, the server device 101 distributes the content to the portable playback device 2502 or the playback device 2503 in response to the request. The details of the server device 101 are described in later.

When the card 2504 is inserted into the portable playback device 2502 by the user, the portable playback device 2502 connects to the server device 2501, and purchases a content designed for portable playback devices, which has a resolution and a bit rate suitable for portable playback devices, and records a purchase certificate of the purchased content into the inserted card 104. The portable playback device 2502 receives the purchased content designed for portable playback devices for playback. The details of the portable playback device 2502 are described in later.

When the card 2504 is inserted into the playback device 2503 by the user, the playback device 2503 connects to the server device 101 to request for a content. The playback device 103 receives the content, and plays back the received content. The details of the playback device 2503 are described in later.

Note that, in order to perform communication between the server device 2501 and the portable playback device 2502 and communication between the server device 2501 and the playback device 2503, it is necessary to establish a secure communication path to transmit/receive data therebetween. A general method such as SSL may be employed for the communication, and description thereof is omitted here.

3.2 Structure of Recording Medium (Card) 2504

Figure 27:
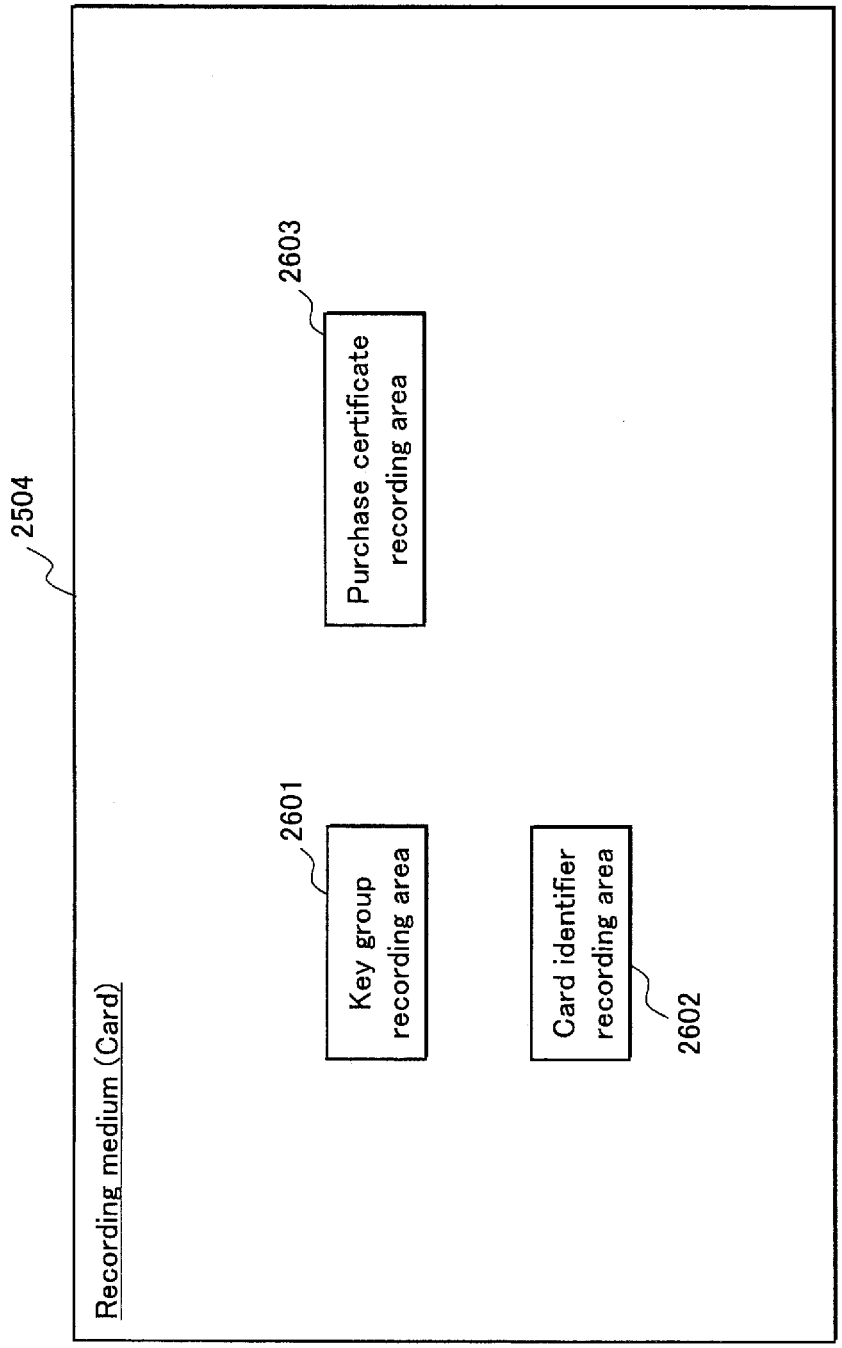
FIG. 27 is a block diagram showing the structure of a recording medium (card) 2504.

The card 2504 is composed of, as shown in FIG. 27, a key group recording area 2601, a card identifier recording area 2602, and a purchase certificate recording area 2603.

The key group recording area 2601 is the same as the key group recording area 201 described in the embodiment 1, and accordingly description thereof is omitted here.

The card identifier recording area 2602 is the same as the card identifier recording area 202 described in the embodiment 1, and accordingly description thereof is omitted here.

The purchase certificate recording area 2603 is the same as the purchase certificate recording area 206 described in the embodiment 1, and accordingly description thereof is omitted here. Also, a purchase certificate to be recorded in the purchase certificate recording area 2063 has the same data structure as that described in the embodiment 1, and accordingly description thereof is omitted here.

3.3 Structure of Portable Playback Device 2502

Here, a detailed description is given of the structure of the portable playback device 2502.

Figure 28:
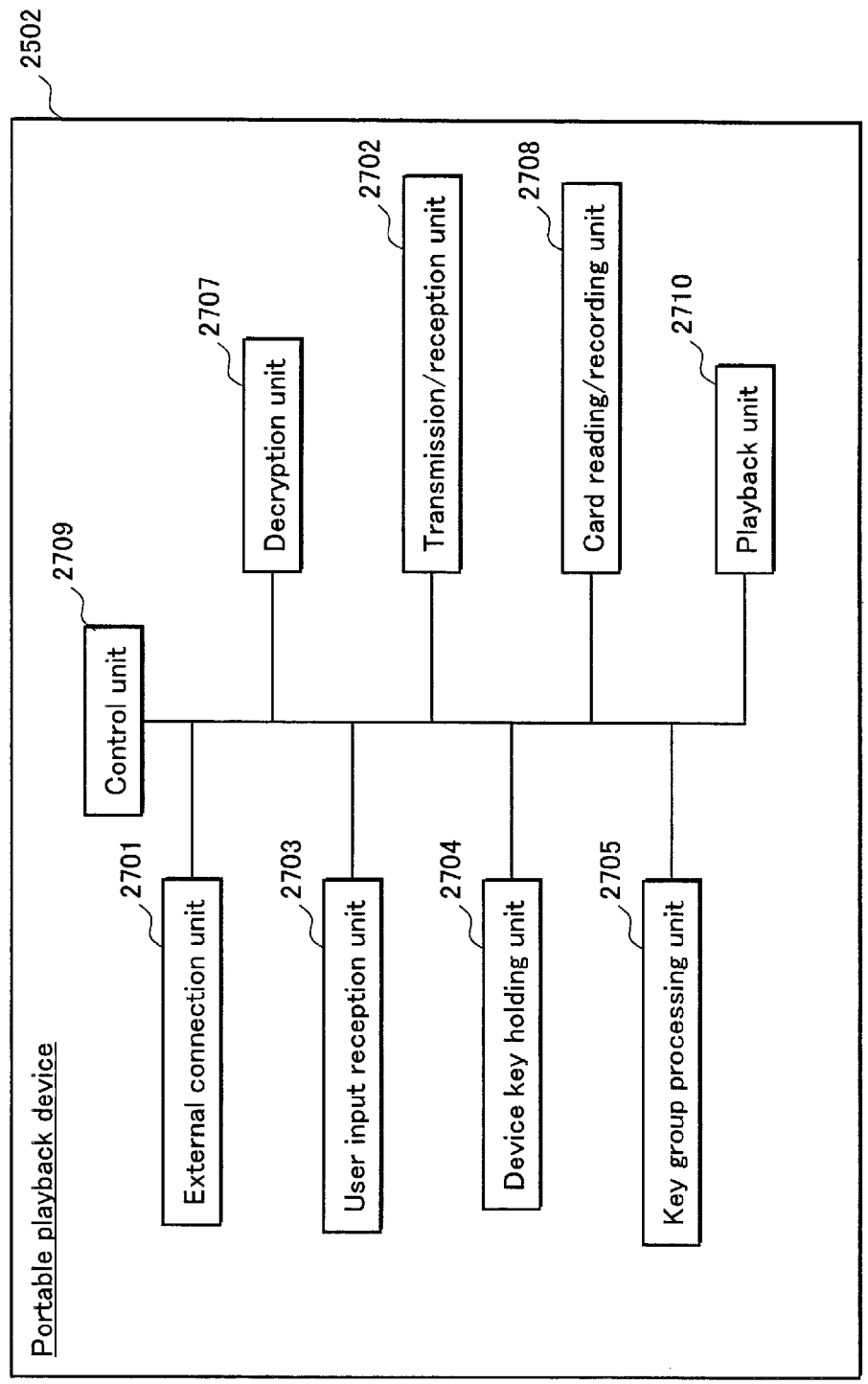
FIG. 28 is a block diagram showing the structure of a portable playback device 2502.

The portable playback device 2502 includes, as shown in FIG. 28, an external connection unit 2701, a transmission/reception unit 2702, a user input reception unit 2703, a device key holding unit 2704, a key group processing unit 2705, a decryption unit 2707, a card reading/recording unit 2708, a control unit 2709, and a playback unit 2710.

The portable playback device 2502 is composed of a microprocessor, a RAM, a ROM, a hard disk, and so on, which are not specifically illustrated. The RAM, the ROM, and the hard disk each have stored thereon a computer program. Functions of the portable playback device 2502 are achieved by the microprocessor operating in accordance with the computer programs.

The functional blocks of the portable playback device 2502 are each typically realized as an LSI that is an integrated circuit, which include the external connection unit 2701, the transmission/reception unit 2702, the user input reception unit 2703, the device key holding unit 2704, the key group processing unit 2705, the decryption unit 2707, the card reading/recording 2708, the control unit 2709, and the playback unit 2710. These functional blocks may be separately integrated into one chip, or integrated into one chip including part or all of the functional blocks.

Also, although the LSI is used here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it may be possible to use an FPGA programmable after manufacturing LSIs or a reconfigurable processor in which connection and setting of a circuit cell inside an LSI can be reconfigured after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

Moreover, the functional blocks each may be realized as software or as a combination of an LSI and software. Such software may be tamper-resistant.

(1) External Connection Unit 2701

The external connection unit 2701 connects to the external server device 2501 in order to receive a content.

(2) Transmission/Reception Unit 2702

After the external connection unit 2701 connects to the server device 2501, the transmission/reception unit 2702 transmits a request for a content to the server device 2501, and receives the content from the server device 2501.

(3) User Input Reception Unit 2703

The user input reception unit 2703 receives a request for a content, which is to be transmitted to the server device 2501, from the user via the transmission/reception unit 2702.

(4) Device Key Holding Unit 2704

The device key holding unit 2704 holds therein a device key for use in decrypting an encrypted media key included in a key group read from the card 2504.

(5) Key Group Processing Unit 2705

The key group processing unit 2705 calculates a media key.

The key group processing unit 2705 extracts, from the key group, an encrypted media key resulting from encryption using the device key held in the device key holding unit 2704, and decrypts the extracted encrypted media key using the device key, thereby calculating a media key.

(6) Decryption Unit 2707

The decryption unit 2707 decrypts an encrypted content.

Specifically, the decryption unit 2707 decrypts an encrypted content using a title key, thereby obtaining a plaintext content.

(7) Card Reading/Recording Unit 2708

The card reading/recording unit 2708 has an insertion unit (slot) into which the card 2504 is insertable. With the card 2504 inserted into the insertion unit, the card reading/recording unit 2708 reads/writes various information from/into the card 104.

Specifically, the card reading/recording unit 2708 reads the key group and the card identifier from the key group recording area 2601 and the card identifier recording area 2602 of the card 2504, respectively. Also, the card reading/recording unit 2708 records a purchase certificate into the purchase certificate recording area 2603.

(8) Playback Unit 2710

The playback unit 2710 plays back a content recorded in the card 2504 which is suitable for the attribute of the portable playback device 2502.

Although not illustrated, the portable playback device 2502 has a display unit such as a display. The display unit displays the content that is being played back.

(9) Control Unit 2709

The control unit 2709 manages and controls the above units (1) to (8) to realize connection to the server device 2501, transmission of a content request, recording into the card 2504, content playback, and so on.

3.4 Structure of Playback Device 2503

Here, a detailed description is given of the structure of the playback device 2503.

Figure 29:
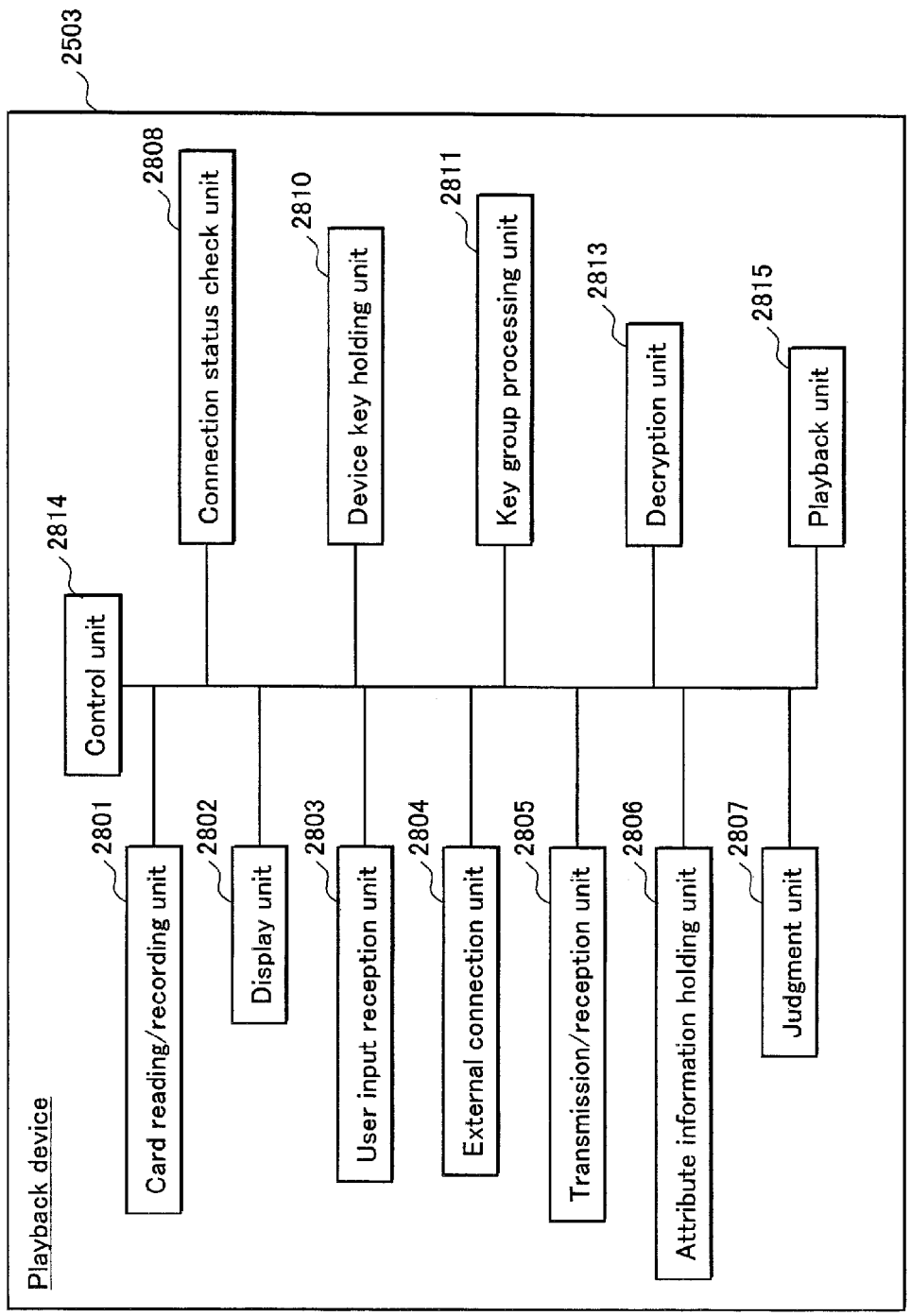
FIG. 29 is a block diagram showing the structure of a playback device 2503.

The playback device 2503 includes, as shown in FIG. 29, a card reading/recording unit 2801, a display unit 2802, a user input reception unit 2803, an external connection unit 2804, a transmission/reception unit 2805, an attribute information holding unit 2806, a judgment unit 2807, a connection status check unit 2808, a device key holding unit 2810, a key group processing unit 2811, a decryption unit 2813, a control unit 2814, and a playback unit 2815.

The playback device 2503 is composed of a microprocessor, a RAM, a ROM, a hard disk, and so on, which are not specifically illustrated. The RAM, the ROM, and the hard disk each have stored thereon a computer program. Functions of the playback device 2503 are achieved by the microprocessor operating in accordance with the computer programs.

The functional blocks of the playback device 2503 are each typically realized as an LSI that is an integrated circuit, which include the card reading/recording unit 2801, the display unit 2802, the user input reception unit 2803, the external connection unit 2804, the transmission/reception unit 2805, the attribute information holding unit 2806, the judgment unit 2807, the connection status check unit 2808, the device key holding unit 2810, the key group processing unit 2811, the decryption unit 2813, the control unit 2814, and the playback unit 2815. These functional blocks may be separately integrated into one chip, or integrated into one chip including part or all of the functional blocks.

Also, although the LSI is used here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it may be possible to use an FPGA programmable after manufacturing LSIs or a reconfigurable processor in which connection and setting of a circuit cell inside an LSI can be reconfigured after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

Moreover, the functional blocks each may be realized as software or as a combination of an LSI and software. Such software may be tamper-resistant.

(1) Card Reading/Recording Unit 2801

The card reading/recording unit 2801 has an insertion unit (slot) into which the card 2504 is insertable. With the card 2504 inserted into the insertion unit, the card reading/recording unit 2801 reads/writes various information from/into the card 2504.

Specifically, the card reading/recording unit 2801 reads the key group, the card identifier, and the purchase certificate from the key group recording area 2601, the card identifier recording area 2602, and the purchase certificate recording area 2603 of the card 2054, respectively.

(2) Display Unit 2802

The display unit 2802 displays a contents list of contents acquirable by the playback device 2503, based on acquisition permission information contained in the purchase certificate read from the card 2504. Also, the display unit 2802 displays a content that is being played back.

(3) User Input Reception Unit 2803

The user input reception unit 2803 receives a user's selection of a content among the contents list of contents acquirable by the playback device 2503, which is displayed on the display unit 2802.

(4) External Connection Unit 2804

The external connection unit 2804 connects to the server device 2501, based on a result of the user's selection received by the user input reception unit 2803.

(5) Attribute Information Holding Unit 2806

The attribute information holding unit 2806 holds therein the attribute of the playback device 2503 or an attribute of a display connected to the playback device 2503 (such as a resolution, a file format, and a copyright protection method that are supported).

(6) Transmission/Reception Unit 2805

The transmission/reception unit 2805 transmits/receives information to/from the server device 2501.

Specifically, after the external connection unit 2804 connects to the server device 2501, the transmission/reception unit 2805 transmits a request for a content to the server device 2501. Also, the transmission/reception unit 2805 receives the content from the server device 2501. Together with the request for the content, the transmission/reception unit 2805 transmits the purchase certificate and the card identifier read from the card 2504 and the attribute of the playback device 2503.

(7) Judgment Unit 2807

The judgment unit 2807 judges whether to request the server device 101 for a content suitable for the playback device 2503.

Specifically, the judgment unit 2807 judges whether to request for a content suitable for the playback device 2503, based on a result of the user's selection received by the user input reception unit 2803, a result of check performed by the connection status check unit 2808, and acquisition permission information contained in the purchase certificate.

(8) Connection Status Check Unit 2808

The connection status check unit 2808 checks whether or not the playback device 2503 is physically connected to an external device via a wired or wireless communication.

Specifically, the connection status check unit 2808 checks whether the playback device 2503 can access a predetermined URL. When checking that the playback device 2503 can access the predetermined URL, the connection status check unit 2808 judges that the playback device 2503 is externally connected. When not checking that the playback device 2503 can access the predetermined URL, the connection status check unit 2808 judges that the playback device 2503 is not externally connected.

(9) Device Key Holding Unit 2810

The device key holding unit 2810 holds therein a device key for use in decrypting an encrypted media key included in a key group read from the card 2504.

(10) Key Group Processing Unit 2811

The key group processing unit 2811 calculates a media key.

The key group processing unit 2811 extracts, from the key group, an encrypted media key resulting from encryption using the device key held in the device key holding unit 2810, and decrypts the extracted encrypted media key using the device key, thereby calculating a media key.

(11) Decryption Unit 2813

The decryption unit 2813 decrypts an encrypted content.

Specifically, the decryption unit 2813 decrypts an encrypted content using a title key, thereby obtaining a plain-text content.

(12) Playback Unit 2815

The playback unit 2815 plays back a content received from the server device 2501 which is suitable for the attribute of the playback device 2503.

Note that the display unit 2802 displays the content that is being played back.

(13) Control Unit 2814

The control unit 2814 manages and controls the above units (1) to (12) to realize connection to the server device 2501, transmission of a content request, content playback, and so on.

3.5 Structure of Server Device 2501

Here, a detailed description is given of the structure of the server device 2501.

Figure 30:
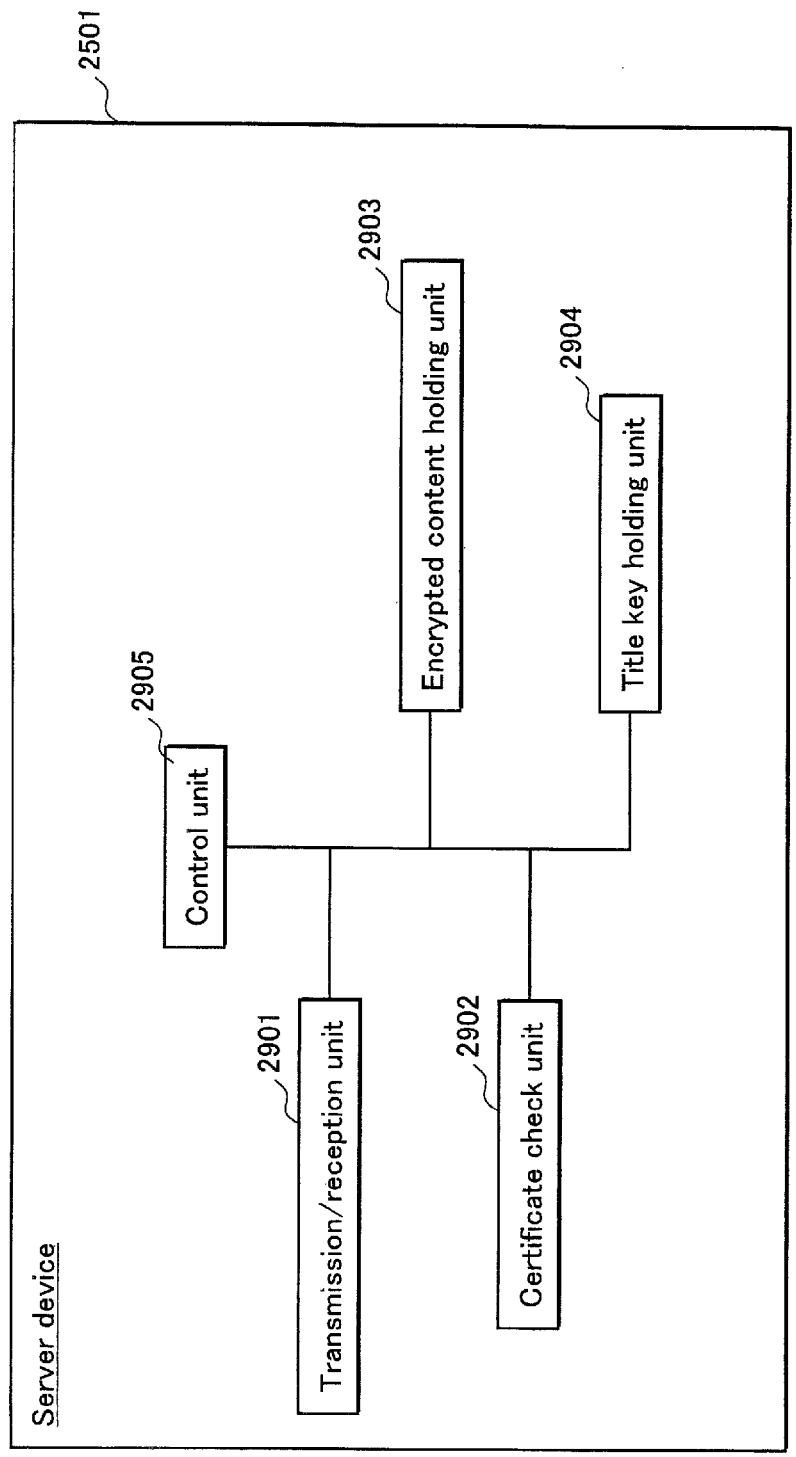
FIG. 30 shows the structure of a server device 2501.

The server device 2501 includes, as shown in FIG. 30, a transmission/reception unit 2901, a certificate check unit 2902, an encrypted content holding unit 2903, and a title key holding unit 2904.

The server device 2501 is composed of a microprocessor, a RAM, a ROM, a hard disk, and so on, which are not specifically illustrated. The RAM, the ROM, and the hard disk each have stored thereon a computer program. Functions of the server device 2501 are achieved by the microprocessor operating in accordance with the computer programs.

The functional blocks of the server device 2501 are each typically realized as an LSI that is an integrated circuit, which include the transmission/reception unit 2901, the certificate check unit 2902, the encrypted content holding unit 2903, and the title key holding unit 2904. These functional blocks may be separately integrated into one chip, or integrated into one chip including part or all of the functional blocks.

Also, although the LSI is used here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it may be possible to use an FPGA programmable after manufacturing LSIs or a reconfigurable processor in which connection and setting of a circuit cell inside an LSI can be reconfigured after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

Moreover, the functional blocks each may be realized as software or as a combination of an LSI and software. Such software may be tamper-resistant.

(1) Transmission/Reception Unit 2901

The transmission/reception unit 2901 transmits/receives information to/from each of the portable playback device 2502 and the playback device 2503.

Specifically, the transmission/reception unit 2901 receives a request for a content from each of the portable playback device 2502 and the playback device 2503, and transmits an encrypted content and a title key to each of the portable playback device 2502 and the playback device 2503. Furthermore, the transmission/reception unit 2901 receives the purchase certificate and the card identifier from the playback device 2503.

(2) Certificate Check Unit 2902

The certificate check unit 2902 judges whether to transmit a content to a device which has requested for the content.

Specifically, the certificate check unit 2902 checks whether the purchase certificate, which has been received from the playback device 2503, has described therein that distribution of the content requested by the playback device 2503 is permitted. Furthermore, the certificate check unit 2902 checks that the purchase certificate has not been tampered with and has been verified, by verifying a signature appended to the purchase certificate. Moreover, the certificate check unit 2902 checks that the request for the content has been received from a device into which a recording medium described in the purchase certificate is inserted, based on the card identifier described in the purchase certificate and the received card identifier. Only when confirming the authenticity of the request via all the above checks, the certificate check unit 2902 permits transmission of the content requested by the playback device 2503.

(3) Title Key Holding Unit 2904

The title key holding unit 2904 holds therein a plurality of title keys.

(4) Encrypted Content Holding Unit 2903

The encrypted content holding unit 2903 holds therein a plurality of title names that are each in correspondence with a plurality of encrypted contents, in the same way as the encrypted content holding unit 1103 described in the Embodiment 1 (see FIG. 13). The plurality of encrypted contents, which are in correspondence with each title name, are each identified by the title name. The plurality of encrypted contents are each obtained by encrypting a content generated in a format compatible with an attribute of a playback device, with use of a different title key.

(5) Control Unit 2905

The control unit 2905 manages and controls the above units (1) to (4) to realize check of a purchase certificate, transmission of a content requested by the playback device 2503, transmission of a title key corresponding to the encrypted content, and so on.

3.6 Operations of Portable Playback Device 2502

Figure 31:
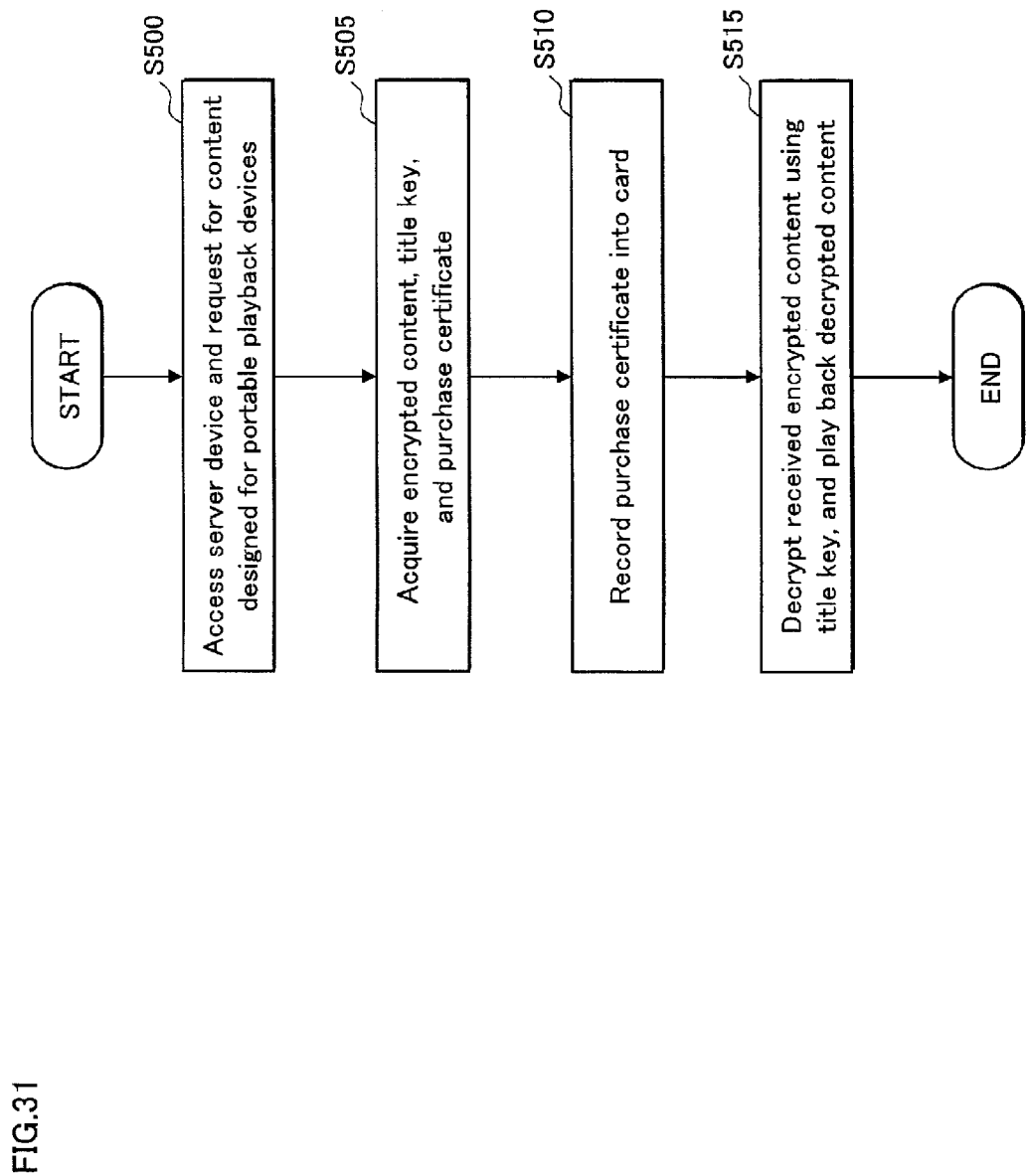
FIG. 31 is a flow chart showing the operations of the portable playback device 2502.

The operations of the portable playback device 2502 are described with reference to FIG. 31.

The playback device 2502 connects to the server device 2501 via the external connection unit 2701, and requests for a content designed for portable playback devices via the transmission/reception unit 2702 (Step S500).

The transmission/reception unit 2702 acquires an encrypted content, a title key, and a purchase certificate from the server device 2501 (Step S505).

The card reading/recording unit 2708 records the acquired purchase certificate into the card 2504 (Step S510).

The decryption unit 2707 decrypts the acquired encrypted content using the title key, and the playback unit 2710 plays back the decrypted content (Step S515).

3.7 Operations of Playback Device 2503

Figure 32:
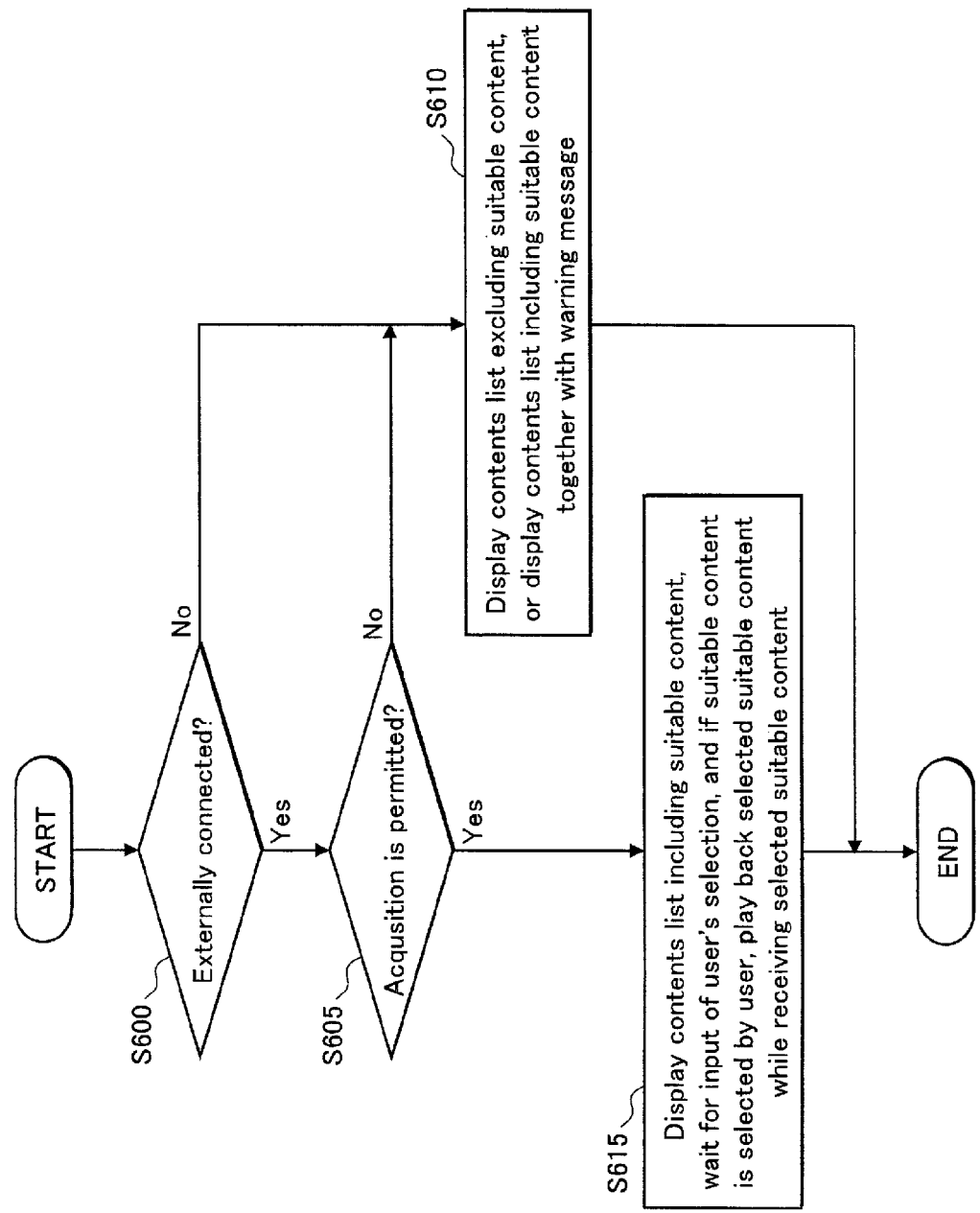
FIG. 32 is a flow chart showing the operations of the playback device 2503.

The operations of the playback device 2503 are described with reference to FIG. 32.

The connection status check unit 708 judges whether the playback device 2503 is externally connected (Step S600).

When the connection status check unit 708 judges that the playback device 2503 is not externally connected (Step S600: No), the display unit 2802 displays a contents list of contents acquirable by the playback device 2503 excluding a suitable content, or displays the contents list including the suitable content together with a warning message (Step S610).

When the connection status check unit 708 judges that the playback device 2503 is externally connected (Step S600: Yes), the control unit 2814 reads the purchase certificate from the purchase certificate recording area 2603 of the card 2504 via the card reading/recording unit 2801, and judges whether acquisition of a suitable content generated in a format compatible with the attribute of the playback device 2503 is permitted, based on acquisition permission information contained in the read purchase certificate (Step S605).

When the judgment unit 707 judges that acquisition of the content is not permitted (Step S605: No), the processing in Step S610 is performed.

When the judgment unit 707 judges that acquisition of the suitable content is permitted (Step S605: Yes), the display unit 2802 displays the contents list of acquirable contents including the suitable content. The user input reception unit 2803 waits for input of selection from the user. When the suitable content is selected by the user, the playback unit 2815 plays back the selected content while the transmission/reception unit 2805 receives the selected content (Step S615). Note that when the user selects a content, the playback device 2503 transmits a request for the selected content to the server device 2501, together with the purchase certificate and the card identifier. When the server device 2501 checks that distribution of the selected content is permitted and has succeeded in signature verification, the playback device 2503 receives the selected content.

3.8 Operations of Server Device 2501

Figure 17:
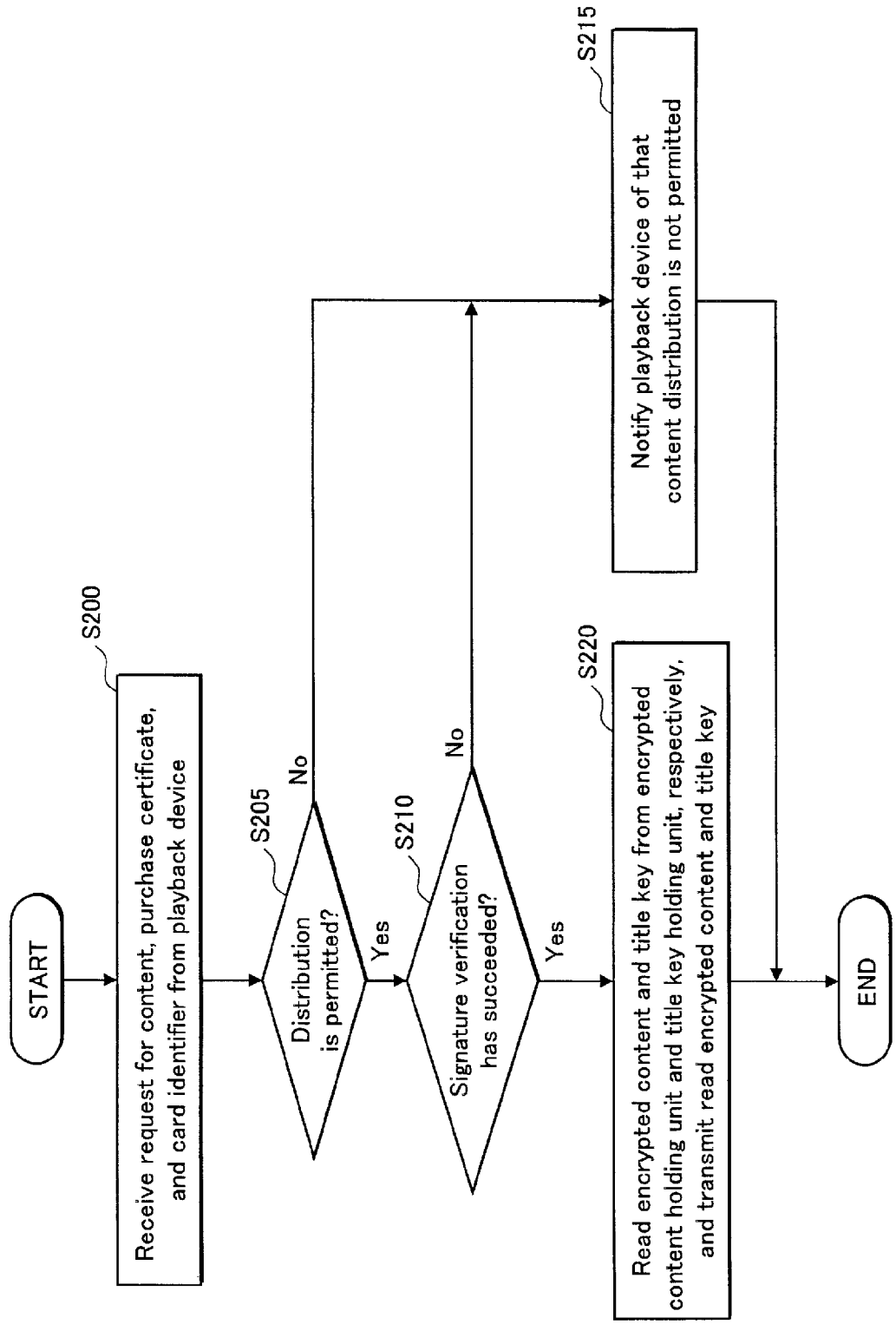
FIG. 17 is a flow chart showing the operations of the server device 101.

The operations of the server device 2501 are the same as those shown in the flow chart of FIG. 17 in the embodiment 1, and accordingly description thereof is omitted here.

4. Modification Examples

Although the present invention has been described in the above embodiments, the present invention is of course not limited to the above embodiments. The present invention includes the following modification examples.

(1) In the above embodiments, a purchase certificate contains information indicating whether content acquisition is permitted.

Alternatively, the purchase certificate may not contain information indicating whether content acquisition is permitted.

FIG. 33 shows an example of a purchase certificate in this case. The purchase certificate according to the present modification example contains a title name, a card identifier, destination information, and a signature.

The title name and the card identifier are the same as those in the above embodiments, and accordingly descriptions thereof are omitted here.

The destination information indicates a destination from which a content is to be acquired, which is generated in a format compatible with an attribute of a device into which a card is inserted.

The signature indicates signature data with respect to the title name and the card identifier.

According to the present modification example, in the case where the playback device judges that a content generated in a format compatible with the attribute of the playback device is not recorded in a card and the playback device is externally connected, the playback device requests the server device for the content generated in the format compatible with the attribute of the playback device. The server device performs signature verification, and judges whether to permit distribution of the requested content. When the server device has succeeded in the signature verification and judges to permit distribution of the requested content, the server device distributes an encrypted content corresponding to the requested content and a title key corresponding to the encrypted content.

(2) In the above embodiments, it is impossible to acquire a content unless acquisition of the content is permitted.

Alternatively, the following structure may be employed, for example. Assume a case where a content is requested by a playback device having a new attribute which is not indicated by acquisition permission information contained in a purchase certificate of the content, namely, a playback device having a new function. In such a case, when holding therein a content generated in a format compatible with the new attribute, the server device may distribute the content to the playback device having the new function. Here, the server device receives a purchase certificate recorded in a recording medium inserted into the playback device having the new function, together with an inquiry as to whether distribution of the content is permitted. In the case where the server device confirms the authenticity of the purchase certificate as a result of verification and holds therein the content generated in the format compatible with the new attribute, the server device distributes the content to the playback device having the new function. The server device unconditionally distributes the content as long as the authenticity of the purchase certificate is confirmed. Alternatively, the following may be employed. After confirming the authenticity of the purchase certificate, the server device further judges whether distribution of the content to the playback device having the new function is permitted. When judging affirmatively, the server device distributes the content to the playback device having the new function.

Also, in this case, the server device transmits, to the playback device having the new function, acquisition permission information and destination information indicating a destination from which the content generated in the format compatible with the new attribute it to be acquired, and a new signature. Then, the playback device having the new function adds the received acquisition permission information and destination information to the purchase certificate, and updates a signature contained in the purchase certificate with the received new signature. Alternatively, the server device may transmit, to the playback device having the new function, a new purchase certificate containing acquisition permission information and destination information relating to the content generated in the format compatible with the new attribute. Then, the playback device having the new function updates the purchase certificate recorded in the recording medium with the received new purchase certificate. That is, any method may be employed as long as the purchase certificate recorded in the recording medium is updated with a new purchase certificate that contains acquisition permission information and destination information relating to the content generated in the format compatible with the new attribute of the playback device having the new function.

(3) In the above embodiments, a purchase certificate contains a title name.

Alternatively, a title ID may be contained in the purchase certificate, instead of the title name. In other words, anything may be contained in the purchase certificate as long as a plurality of contents held in the encrypted content holding unit of the server device are identified as one group.

Furthermore, index information according to the embodiments 1 and 2 may contain a title ID instead of a title name, in the same way.

(4) In the above embodiments 1 and 2, encryption of a title key is performed with use of a media unique key, which is generated from a media key and a card identifier.

Alternatively, encryption of a title key may be performed with use of a device key, which is held in a device which has received the title key.

(5) In the above embodiments, a purchase certificate contains a card identifier for use in verification.

Alternatively, the purchase certificate may contain a user ID and a purchase date for use in verification, instead of the card identifier. Further alternatively, the purchase certificate may contain at least two of the card identifier, the user ID, and the purchase date for use in verification.

(6) In the above embodiments, a device, which has purchased a content, records a purchase certificate of the content into a card. Then, the card in which the purchase certificate is recorded is inserted into another device, and the other device acquires the content.

Alternatively, the following structure may be employed, for example: the device, which has purchased the content, records the purchase certificate into a storage device included therein, and the other device directly connects to the device that has purchased the content via a USB (Universal Serial Bus) or the like, and reads the purchase certificate from the device that has purchased the content. Here, the storage device, which is included in the device that has purchased the content, may be a storage device detachable from the device (such as a recording medium) or a storage device undetachable from the device.

Further alternatively, the following structure for acquiring the purchase certificate may be employed that a QR code of the content is printed out on a sheet instead of recording into the card, and the QR code printed out on the sheet is read by the other device.

(7) In the embodiments, a device (playback device or portable playback device) into which a card is inserted may have a mechanism for verifying whether the inserted card is an authenticated card in which a device, which has purchased a content, has recorded a purchase certificate of the content.

This mechanism can prevent the purchase certificate from being copied into another card for malicious use.

(8) In the embodiments, with respect to a certain content, the portable playback device purchases a low-resolution content designed for portable playback devices, which corresponds to the certain content, acquires a purchase certificate of the certain content. Then, the playback device acquires a high-resolution and high-quality FHD content, which corresponds to the certain content. Alternatively, the following structure may be employed, for example, that the playback device purchases the high-resolution and high-quality FHD content, and acquires the purchase certificate, and then the portable playback device acquires the low-resolution content designed for portable playback devices. The order of content acquisition may be arbitrary as long as in the case where a content which has been already purchased is unsuitable for an attribute of a device that is to play back the content, a content is acquired that corresponds to the purchased content and is suitable for an attribute of the device.

Also, similarly in the embodiment 2, the following structure may be employed that the portable playback device purchases a content generated for each attribute, and records the purchased contents into a card, and then the playback device acquires a content generated in a format compatible with an attribute of the playback device from the card.

(9) In the above embodiments, an example is given where a signature is used for preventing tampering of a purchase certificate. Alternatively, tampering of the purchase certificate may be prevented by generating a signature with use of a public key encryption algorithm, and verifying the generated signature, or by generating an authenticator (MAC: Message Authentication Code) with use of a secret key encryption algorithm and verifying the generated authenticator. Further alternatively, tampering of the purchase certificate may be prevented by encrypting all information contained in the purchase certificate.

(10) In the above embodiments, the playback device plays back a content while downloading the content. Alternatively, the playback device may play back the content after completing download of the content.

(11) In the above embodiments, when the user selects playback of a content, a device (portable playback device or playback device) connects to the server device to download the content. Alternatively, the following structure may be employed, for example, that while the user is watching a certain content (which has been already recorded in a card and has no need of connection to the server device) selected from a contents list, the device automatically downloads another content which is permitted to be acquired, based on a purchase certificate recorded in the card, independently from the certain content that the user is watching. Further alternatively, the device may check with the user as to whether to download a content, and download the content if permitted by the user.

(12) In the above embodiments 1 and 2, in order to record a received encrypted content, the card reading/recording unit of the portable playback device or the playback device may reserve a space in a card for the size of a content which is permitted to be acquired based on a purchase certificate. Alternatively, the card reading/recording unit may acquire information relating to the size of a content which is permitted to be acquired but has not yet been acquired, and record a dummy file (such as a file in which null data is recorded) having the same size as the content. These structures can prevent that the content cannot be recorded due to a insufficient capability.

(13) In the above embodiments, in the case where a communication path has a vacant (or sufficient) band when a device (portable playback device or playback device) plays back a certain content while downloading the certain content, another content permitted to be acquired based on acquisition permission information contained in a purchase certificate may be downloaded and recorded into a card. Further alternatively, the user input reception unit may receive an instruction as to whether to download the other content in parallel with download of the certain content.

(14) In the above embodiments 1 and 2, in the case where only a QVGA content is recorded in a card and a VGA content and an FHD content are permitted to be acquired, a priority of content download may be determined based on a predetermined rule, which is, for example, in which a content of a lower resolution and a smaller size is downloaded preferentially. Alternatively, the user input reception unit may receive an instruction as to which resolution of a content is to be downloaded preferentially.

(15) In the above embodiments, when the connection status check unit of the playback device judges that the playback device is not externally connected, the display unit of the playback device displays a contents list of acquirable contents excluding a content requested by the playback device. Alternatively, when judging that the playback device is not externally connected, the display unit of the playback device may display a message that prompts the user to establish an external connection.

(16) In the above embodiments, resolution is used as an example for judging whether a content is suitable for a device (portable playback device or playback device). Alternatively, judgment may be performed as to whether a content is suitable with use of a processing capability of a device (such as the above described file format and copyright protection method), the bit rate of the content, and so on, in addition to the resolution.

Further alternatively, judgment may be performed as to whether a content is suitable for a device based on an output audio (such as stereo 2 channel output and 5.1 channel output), or based on whether the device is capable of displaying subtitles, whether the device is capable of performing stereoscopic display, and so on.

(17) In the above embodiments, a device (portable playback device or playback device) acquires a purchase certificate of a content, and presents that the content has been already purchased to the server device. Alternatively, the server device may manage the purchased content. Specifically, the following structure may be employed that the server device stores therein and manages a pair of a title name and a card identifier for each content, receives a user's desired pair of a title name and a card identifier from the device, and transmits back a content, which corresponds to the pair and is permitted to be distributed, to the device. The following structure may be also employed that the server device receives only a card identifier, and transmits back a contents list of distributable contents, which corresponds to the received card identifier, to the device. Furthermore, the following structure may be employed that the server device stores therein and manages a pair of a title name and a user identifier for each content, receives a user's desired pair of a title name and a user identifier from the device, and transmits back a content, which corresponds to the pair and is permitted to be distributed. The following structure may be also employed that the server device receives only a user identifier, and transmits back a contents list of distributable contents, which corresponds to the received user identifier, to the device.

(18) In the above embodiments, the following structure may be employed that contents that have the same title name and each have a different resolution and/or a different file format may be integrated into a single file in a pseudo manner, and the contents are presented (displayed) to the user as the single file.

(19) In the above embodiments, a purchase certificate contains acquisition permission information with respect to contents that have been generated based on the same content and differ from each other in resolution. Alternatively, instead of the resolution, the purchase certificate may contain acquisition permission information with respect to contents that have been generated based on the same content and differ from each other in file format, copyright protection method, and so on.

The acquisition permission information only needs to be provided for each content identified by a single attribute and one of title name and a title ID.

Further alternatively, the acquisition permission information may be provided with respect to contents that have been generated not based on the same content but based on contents that differ from and relate to each other.

(20) In the above embodiments 1 and 2, a device (portable playback device or playback device) acquires index information from the server device. Alternatively, the device may generate index information depending on a received content.

(21) In the above embodiments, a device (portable playback device or playback device) explicitly holds therein attribute information. However, the present invention is not limited to this. For example, since the portable playback device according to the embodiment 2 is compatible with only the file format A, attribute information does not need to be held. Accordingly, the portable playback device may check whether a content in the file format A is recorded, and select the content if recorded. Alternatively, the following structure may be employed that only a content in the file format A with which the portable playback device is compatible is recorded such that the portable playback device can identify the content. For example, the content may be recorded in a folder having a predetermined folder name, or the content may be converted into a file having a predetermined specific file name and then recorded.

(22) In the above embodiment 2, the portable playback device selects a suitable encrypted content among one or more encrypted contents, and plays back the selected content after decryption. Alternatively, the playback device may select a suitable content among one or more contents recorded in a card, and play back the selected content.

(23) In the above embodiments, a single device has a plurality of functions (structural elements). Alternatively, the present invention includes a case where the functions (structural elements) are spread across a plurality of devices and any combination of the spread functions realizes the same effects and functions as those in the embodiments.

(24) In the above embodiments, in order to purchase a content, the portable playback device may transmit its attribute (such as a resolution) to the server device, by default. Alternatively, in the case where a destination for purchasing the content is a website for portable playback devices, the portable playback device may have no need to transmit the attribute to the server device. Further alternatively, the user may designate a type of attribute to be transmitted (such as a resolution of a content the user wants to purchase).

(25) In the above embodiments, update of index information by the index information update unit may be performed in the following manner that a device itself generates index information based on a received content, and records the generated index information in the index information recording area of the recording medium. Alternatively, update of index information may be performed in the following manner that the server device transmits a content and index information corresponding to the content to the device, and the index information update unit writes the index information received from the server device into the index information recording area of the recording medium.

(26) In the above embodiments, a plurality of contents corresponding to the same one title name are each encrypted with use of a different title key.

Alternatively, the plurality of contents corresponding to the same one title name may each be encrypted with use of the same one title key.

(27) In the above embodiments, the server device has in advance recorded therein encrypted contents which each have been generated in accordance with a processing capability of each device.

Alternatively, the following structure may be employed that in the case where the server device judges to distribute a requested content to the playback device as a result of signature verification or the like, the server device generates a content in a format compatible with the processing capability of the playback device, encrypts the content, and distributes the encrypted content to the playback device.

(28) The method described in the above embodiments may be realized in the following manner that a memory has stored thereon a program in which the procedure of the method is written, and a CPU (Central Processing Unit) or the like reads the program from the memory and executes the read program.

Alternatively, the program in which the procedure of the method is described may be stored in a recording medium and distributed.

(29) Part or all of structural elements of each of the above devices may be composed of an IC card detachable from the device or a single module. The IC card or the module is a computer system composed of a microprocessor, a ROM, a RAM, and so on. The IC card or the module may include a super multifunctional LSI. Functions of the IC card or the module are achieved by the microprocessor operating in accordance with a computer program. The IC card or the module may be tamper-resistant.

(30) The present invention may be the above-described method. Also, the present invention may be a computer program for realizing the methods by a computer or a digital signal composed of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc), and a semiconductor memory, which records therein the computer program or the digital signal. Furthermore, the present invention may be the computer program or the digital signal recorded in the recording medium.

Also, the present invention may be the computer program or the digital signal transmitted via an electric communication network, a wireless or wired communication network, a network such as the Internet, data broadcasting, or the like.

Furthermore, the present invention may be a computer system that includes a microprocessor and a memory. The memory may store therein the computer program, and the microprocessor may operate in accordance with the computer program.

Furthermore, the present invention may be implemented by another computer system, by transmitting the computer program or digital signal recorded in the recording medium to the other computer system, or by transmitting the computer program or digital signal to the other computer system via the network.

(31) The present invention may be any combination of the above embodiments and modification examples.

5. Supplementary Description

In order to achieve the above aim, a playback device relating to one embodiment of the present invention is a playback device for playing back contents, comprising: a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices; an acquisition unit operable to acquire, from the server device, one of the one or more contents corresponding to the playback right that is in a format compatible with the processing capability of the playback device indicated by the capability information; and a playback unit operable to play back the content acquired by the acquisition unit.

With this structure, the playback device acquires the playback right recorded in the recording medium, and transmits the acquired playback right to the server device, together with the capability information indicating its processing capability. Then, the playback device acquires the content generated in the format compatible with its processing capability, and plays back the acquired content. Therefore, no user input is necessary. This allows the playback device to request for the content generated in the format compatible with its processing capability and play back the acquired content, with no need of user input of a user ID or the like.

(2) Here, when judging that the playback right has been confirmed, the server device may transmit the content in the format compatible with the processing capability of the playback device indicated by the capability information.

With this structure, when the playback right recorded in the recording medium is judged to have been confirmed, the playback device can acquire the content generated in the format compatible with its processing capability. This can prevent malicious use by an unauthenticated user.

(3) Here, the playback device may have a slot into which the recording medium is insertable, wherein when the recording medium is inserted into the slot, the transmission unit may read the playback right.

With this structure, when the recording medium is inserted into the playback device, the playback device reads the playback right and transmits the read playback right to the server device. Accordingly, when the recording medium is not inserted into the playback device, the playback device cannot acquire any content. This can prevent malicious use such as simultaneous playback by a plurality of playback devices with use of a single recording medium.

(4) Here, the recording medium may further have recorded therein at least one of the one or more contents corresponding to the playback right, the playback device may further comprise a judgment unit operable to, before the transmission unit transmits the playback right and the capability information, judge whether the at least one recorded content includes the content in the format compatible with the processing capability of the playback device, when the judgment unit judges that the at least one recorded content includes the content in the compatible format, the transmission unit may cancel the transmission of the playback right and the capability information, and the acquisition unit may acquire the content in the compatible format from the recording medium, and when the judgment unit judges that the at least one recorded content does not include the content in the compatible format, the transmission unit may execute the transmission of the playback right and the capability information.

With this structure, when the recording medium does not have recorded therein the content in the format compatible with the processing capability of the playback device, the playback device requests the server device for the content in the compatible format. Accordingly, when the recording medium has recorded therein the content in the compatible format, the playback device can avoid useless communication.

(5) Here, the recording medium may further have recorded therein index information indicating a processing capability required for playing back each of the at least one recorded content, when the recorded index information indicates a processing capability equivalent to the processing capability of the playback device, the judgment unit may judge that the at least one recorded content includes the content in the compatible format, and when the recorded index information does not indicate a processing capability equivalent to the processing capability of the playback device, the judgment unit may judge that the at least one recorded content does not include the content in the compatible format.

With this structure, the playback device can easily judge whether the recording medium has recorded therein the content in the format compatible with its processing capability, with use of the index information.

(6) Here, the playback device may further comprise a recording unit operable to record, into the recording medium, the content in the compatible format acquired by the acquisition unit from the server device and new index information indicating a processing capability required for playing back the acquired content equivalent to the processing capability of the playback device.

With this structure, when the playback device acquires the content in the format compatible with its processing capability, the playback device writes the acquired content in the compatible format into the recording medium together with new index information relating to the acquired content in the compatible format. Accordingly, once the playback device acquires a content, the playback device does not need to request the server device for the content, and can avoid useless communication.

(7) Here, the recording medium may have recorded therein, as the playback right, a certificate indicating that purchase of the one or more contents has been authenticated, the transmission unit may transmit the certificate, and when the server judges that the certificate has been verified, the acquisition unit may acquire the content in the format compatible with the processing capability of the playback device indicated by the capability information.

With this structure, the playback device can use, as the playback right, the certificate indicating that purchase of the one or more contents has been authenticated.

(8) Here, the recording medium may have further recorded therein, for each of the one or more contents that are each in a format compatible with a processing capability different for each of the playback devices, acquisition permission information indicating whether acquisition of each of the one or more contents by each of the playback devices is permitted, the playback device may further comprise an acquisition judgment unit operable to, before the transmission transmits the certificate and the capability information to the server device, judge whether acquisition of the content in the compatible format by the playback device is permitted, with use of acquisition permission information indicating whether acquisition of the content in the compatible format by the playback device is permitted, and when the acquisition judgment unit judges affirmatively, the transmission unit may execute the transmission of the certificate and the capability information of the playback device to the server device.

With this structure, when the acquisition permission information indicates that acquisition of the content in the compatible format by the playback device is permitted, the playback device requests for the content in the format compatible with its processing capability. This can prevent malicious acquisition by an unauthorized playback device.

(9) Here, the acquisition judgment unit may judge whether the recording medium has recorded therein acquisition permission information indicating whether acquisition of the content in the compatible format by the playback device is permitted, and when judging that the recording medium has recorded therein acquisition permission information indicating whether acquisition of the content in the compatible format by the playback device is permitted, the acquisition judgment unit may judge whether acquisition of the content in the compatible format by the playback device is permitted, when the acquisition judgment unit judges that the recording medium does not have recorded therein acquisition permission information indicating whether acquisition of the content in the compatible format by the playback device is permitted, the transmission unit may inquire of the server device as to whether acquisition of the content in the compatible format by the playback device is permitted, and when the server device judges that acquisition of the content in the compatible format by the playback device is permitted, the acquisition unit may acquire the content in the compatible format.

With this structure, when the recording medium does not have recorded in acquisition permission information indicating whether acquisition of the content in the format compatible with the processing capability of the playback device is permitted, the playback device inquires of the server device as to whether acquisition of the content is permitted. Accordingly, in the case where at a time of acquisition of a playback right of a content, a content generated in a format compatible with a processing capability of a playback device has not yet corresponded to the playback right, acquisition permission information relating to the content in the format compatible with the processing capability of the playback device also has not been recorded, of course. After acquisition of the playback right, the playback device becomes available in the market, there is a need for the content in the format compatible with the processing capability of the playback device. Accordingly, in the case where the recording medium does not have recorded therein the acquisition permission information, the playback device inquires of the server device as to whether acquisition of the content is permitted. This allows the playback device to play back the content with a processing capability which can satisfy the user.

(10) Here, when the server device judges that acquisition of the content in the compatible format by the playback device is permitted, the acquisition unit may further acquire, from the server device, new acquisition permission information indicating that acquisition of the content in the compatible format by the playback device is permitted, and write the acquired new acquisition permission information into the recording medium.

With this structure, the playback device writes, into the recording medium, acquisition permission information relating to the content in the format compatible with its processing capability, which has not yet been recorded in the recording medium at the time of acquisition of the playback right. As a result, when another playback device having the same processing capability as the playback device requests for the content, the other playback device can judge whether acquisition of the content is permitted with use of the acquisition permission information. This can avoid useless communication.

(11) Here, the acquisition permission information may be contained in the certificate recorded in the recording medium, the acquisition unit may acquire the new acquisition permission information by acquiring a new certificate that contains the acquisition permission information contained in the recorded certificate and the new acquisition permission information, and the acquisition unit may record the new acquisition permission information by rewriting the recorded certificate with the new certificate.

With this structure, the playback device updates the acquisition permission information by updating the recorded certificate with the acquired new certificate. This needs no modification on the recorded certificate, thereby preventing tampering of the certificate.

(12) Here, the processing capability of the playback device may indicate at least one of the following: an image resolution, a file format, a copyright protection method, and audio that are supported by the playback device, and information indicating whether stereoscopic images are displayable by the playback device, and information indicating whether subtitles are displayable by the playback device.

With this structure, the playback device can acquire a content generated in a format compatible with at least one of an image resolution, a file format, a copyright protection method, and audio that are supported by the playback device, and information indicating whether stereoscopic images are displayable by the playback device, and information indicating whether subtitles are displayable by the playback device.

(13) Here, the recording medium may have recorded therein, at a time when another playback device has purchased a content in a format compatible with a processing capability of the other playback device, all of one or more contents that each have been generated based on the purchased content and in a format compatible with a processing capability different for each of one or more playback devices, and the acquisition unit may acquire one of the one or more contents that is in the format compatible with the processing capability of the playback device from the recording medium.

With this structure, since the recording medium has already recorded therein the content in the format compatible with the processing capability of the playback device, the playback device can play back the content in the format compatible with its processing capability without requesting the server device for the content.

(14) Also, a content distribution system relating to one embodiment of the present invention is a content distribution system that includes a server device for distributing contents, a playback device for playing back the contents, and a recording medium, wherein the playback device comprises: a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices; an acquisition unit operable to acquire, from the server device, one of the one or more contents corresponding to the playback right that is in a format compatible with the processing capability of the playback device indicated by the capability information; and a playback unit operable to play back the content acquired by the acquisition unit, and the server device comprises: a reception unit operable to receive the playback right and the capability information from the playback device; a verification unit operable to perform verification to judge whether the playback right has been confirmed; and a distribution unit operable to, only when the verification unit judges that the playback right has been confirmed, distribute the content in the format compatible with the processing capability of the playback device indicated by the capability information to the playback device.

With this structure, the playback device acquires the playback right recorded in the recording medium, and transmits the acquired playback right to the server device, together with the capability information indicating its processing capability. When judging that the playback right has been confirmed, the server device distributes the content in the format compatible with the processing capability of the playback device. Then, the playback device acquires the distributed content, and plays back the content. Therefore, no user input is necessary. This allows the content distribution system to distribute, to the playback device, the content in the format compatible with the processing capability of the playback device, with no need of user input of a user ID or the like.

INDUSTRIAL APPLICABILITY

The content distribution system and the playback device according to the present invention are useful, as a system for providing digitized contents to users and a device for receiving and playing back digitized contents, respectively.

REFERENCE SIGNS LIST 1 content distribution system
101 server device
102 portable playback device
103 playback device
104 card
104 recording medium
201 key group recording area
202 card identifier recording area
203 encrypted title key recording area
204 encrypted content recording area
205 index information recording area
206 certificate recording area
601 external connection unit
602 transmission/reception unit
603 user input reception unit
604 device key holding unit
605 key group processing unit
606 key conversion unit
607 encryption/decryption unit
608 card reading/recording unit
609 control unit
610 playback unit
701 card reading/recording unit
702 display unit
703 user input reception unit
704 external connection unit
705 transmission/reception unit
706 attribute information holding unit
707 judgment unit
708 connection status check unit
709 index information update unit
710 device key holding unit
711 key group processing unit
712 key conversion unit
713 encryption/decryption unit
714 control unit
715 playback unit
1101 transmission/reception unit
1102 certificate check unit
1103 encrypted content holding unit
1104 title key holding unit
1105 control unit

The invention claimed is:

1. A playback device for playing back contents, comprising:
a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices;
an acquisition unit operable to, when the playback right is judged to have been confirmed, acquire, from the server device, one of the one or more contents corresponding to the playback right that is in a format compatible with the processing capability of the playback device indicated by the capability information; and
a playback unit operable to play back the content acquired by the acquisition unit, wherein
the recording medium further has recorded therein at least one of the one or more contents corresponding to the playback right,
the playback device further comprises
a judgment unit operable to, before the transmission unit transmits the playback right and the capability information, judge whether the at least one recorded content includes the content in the format compatible with the processing capability of the playback device,
when the judgment unit judges that the at least one recorded content includes the content in the compatible format, the transmission unit cancels the transmission of the playback right and the capability information, and the acquisition unit acquires the content in the compatible format from the recording medium, and
when the judgment unit judges that the at least one recorded content does not include the content in the compatible format, the transmission unit executes the transmission of the playback right and the capability information.

2. The playback device of claim 1, having a slot into which the recording medium is insertable, wherein
when the recording medium is inserted into the slot, the transmission unit reads the playback right.

3. The playback device of claim 1, wherein
the recording medium further has recorded therein index information indicating a processing capability required for playing back each of the at least one recorded content,
when the recorded index information indicates a processing capability equivalent to the processing capability of the playback device, the judgment unit judges that the at least one recorded content includes the content in the compatible format, and
when the recorded index information does not indicate a processing capability equivalent to the processing capability of the playback device, the judgment unit judges that the at least one recorded content does not include the content in the compatible format.

4. The playback device of claim 1, further comprising
a recording unit operable to record, into the recording medium, the content in the compatible format acquired by the acquisition unit from the server device and new index information indicating a processing capability required for playing back the acquired content equivalent to the processing capability of the playback device.

5. The playback device of claim 1, wherein
the processing capability of the playback device indicates at least one of the following: an image resolution, a file format, a copyright protection method, and audio that are supported by the playback device, and information indicating whether stereoscopic images are displayable by the playback device, and information indicating whether subtitles are displayable by the playback device.

6. The playback device of claim 1, wherein
the recording medium has recorded therein, at a time when another playback device has purchased a content in a format compatible with a processing capability of the other playback device, all of one or more contents that each have been generated based on the purchased content and in a format compatible with a processing capability different for each of one or more playback devices, and
the acquisition unit acquires one of the one or more contents that is in the format compatible with the processing capability of the playback device from the recording medium.

7. A playback device for playing back contents, comprising:
a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices;
an acquisition unit operable to, when the playback right is judged to have been confirmed, acquire, from the server device, one of the one or more contents corresponding to the playback right that is in a format compatible with the processing capability of the playback device indicated by the capability information; and
a playback unit operable to play back the content acquired by the acquisition unit, wherein
the recording medium has recorded therein, as the playback right, a certificate indicating that purchase of the one or more contents has been authenticated,
the transmission unit transmits the certificate,
when the server judges that the certificate has been verified, the acquisition unit acquires the content in the format compatible with the processing capability of the playback device indicated by the capability information,
the recording medium has further recorded therein, for each of the one or more contents that are each in a format compatible with a processing capability different for each of the playback devices, acquisition permission information indicating whether acquisition of each of the one or more contents is permitted,
the playback device further comprises
an acquisition judgment unit operable to, before the transmission transmits the certificate and the capability information to the server device, judge whether acquisition of the content in the compatible format by the playback device is permitted, with use of acquisition permission information indicating whether acquisition of the content in the compatible format by the playback device is permitted, and
when the acquisition judgment unit judges affirmatively, the transmission unit executes the transmission of the certificate and the capability information of the playback device to the server device.

8. The playback device of claim 7, wherein
the acquisition judgment unit judges whether the recording medium has recorded therein acquisition permission information indicating whether acquisition of the content in the compatible format by the playback device is permitted, and
when judging that the recording medium has recorded therein acquisition permission information indicating whether acquisition of the content in the compatible format by the playback device is permitted, the acquisition judgment unit judges whether acquisition of the content in the compatible format by the playback device is permitted,
when the acquisition judgment unit judges that the recording medium does not have recorded therein acquisition permission information indicating whether acquisition of the content in the compatible format by the playback device is permitted, the transmission unit inquires of the server device as to whether acquisition of the content in the compatible format by the playback device is permitted, and
when the server device judges that acquisition of the content in the compatible format by the playback device is permitted, the acquisition unit acquires the content in the compatible format.

9. The playback device of claim 8, wherein
when the server device judges that acquisition of the content in the compatible format by the playback device is permitted, the acquisition unit further acquires, from the server device, new acquisition permission information indicating that acquisition of the content in the compatible format by the playback device is permitted, and writes the acquired new acquisition permission information into the recording medium.

10. The playback device of claim 9, wherein
the acquisition permission information is contained in the certificate recorded in the recording medium,
the acquisition unit acquires the new acquisition permission information by acquiring a new certificate that contains the acquisition permission information contained in the recorded certificate and the new acquisition permission information, and
the acquisition unit records the new acquisition permission information by rewriting the recorded certificate with the new certificate.

11. A content distribution system that includes a server device for distributing contents, a playback device for playing back the contents, and a recording medium, wherein
the playback device comprises:
a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices;
an acquisition unit operable to, when the playback right is judged to have been confirmed, acquire, from the server device, one of the one or more contents corresponding to the playback right that is in a format compatible with the processing capability of the playback device indicated by the capability information; and a playback unit operable to play back the content acquired by the acquisition unit, and the server device comprises:

a reception unit operable to receive the playback right and the capability information from the playback device;

a verification unit operable to perform verification to judge whether the playback right has been confirmed; and a distribution unit operable to, only when the verification unit judges that the playback right has been confirmed, distribute the content in the format compatible with the processing capability of the playback device indicated by the capability information to the playback device, the recording medium further has recorded therein at least one of the one or more contents corresponding to the playback right, the playback device further comprises a judgment unit operable to, before the transmission unit transmits the playback right and the capability information, judge whether the at least one recorded content includes the content in the format compatible with the processing capability of the playback device, when the judgment unit judges that the at least one recorded content includes the content in the compatible format, the transmission unit cancels the transmission of the playback right and the capability information, and the acquisition unit acquires the content in the compatible format from the recording medium, and when the judgment unit judges that the at least one recorded content does not include the content in the compatible format, the transmission unit executes the transmission of the playback right and the capability information.

12. A playback method for use in a playback device for playing back contents, the playback method comprising:

a transmission step of reading a playback right from an external recording medium, and transmitting the read playback right and capability information indicating a processing capability of the playback device to a server device, the playback right indicating a right to play back one or more contents that each have been generated based on a content and in a format compatible with a processing capability different for each of one or more playback devices;

an acquisition step of, when the playback right is judged to have been confirmed, acquiring, from the server device, one of the one or more contents corresponding to the playback right that is in a format compatible with the processing capability of the playback device indicated by the capability information; and a playback step of playing back the content acquired by the acquisition step, wherein the playback method further comprises a judgment step of, before the transmission step transmits the playback right and the capability information, judging whether the at least one recorded content includes the content in the format compatible with the processing capability of the playback device, when the judgment step judges that the at least one recorded content includes the content in the compatible format, the transmission step cancels the transmission of the playback right and the capability information, and the acquisition step acquires the content in the compatible format from the recording medium, and when the judgment step judges that the at least one recorded content does not include the content in the compatible format, the transmission step executes the transmission of the playback right and the capability information.

13. A non-transitory computer-readable recording medium readable by a computer for use in a playback device for playing back contents, the recording medium having recorded therein a playback program that causes the computer to execute the following steps of:

a transmission step of reading a playback right from an external recording medium, and transmitting the read playback right and capability information indicating a processing capability of the playback device to a server device, the playback right indicating a right to play back one or more contents that each have been generated based on a content and in a format compatible with a processing capability different for each of one or more playback devices;

an acquisition step of, when the playback right is judged to have been confirmed, acquiring, from the server device, one of the one or more contents corresponding to the playback right that is in a format compatible with the processing capability of the playback device indicated by the capability information; and a playback step of playing back the content acquired by the acquisition step, wherein the recording medium further has recorded therein at least one of the one or more contents corresponding to the playback right, the playback method further comprises a judgment step of, before the transmission step transmits the playback right and the capability information, judging whether the at least one recorded content includes the content in the format compatible with the processing capability of the playback device, when the judgment step judges that the at least one recorded content includes the content in the compatible format, the transmission step cancels the transmission of the playback right and the capability information, and the acquisition step acquires the content in the compatible format from the recording medium, and when the judgment step judges that the at least one recorded content does not include the content in the compatible format, the transmission step executes the transmission of the playback right and the capability information.

14. An integrated circuit for use in a playback device for playing back contents, the integrated circuit comprising:

a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices;

an acquisition unit operable to, when the playback right is judged to have been confirmed, acquire, from the server device, one of the one or more contents corresponding to the playback right that is in a format compatible with the processing capability of the playback device indicated by the capability information; and a playback unit operable to play back the content acquired by the acquisition unit, wherein the recording medium further has recorded therein at least one of the one or more contents corresponding to the playback right, the playback device further comprises
a judgment unit operable to, before the transmission unit transmits the playback right and the capability information, judge whether the at least one recorded content includes the content in the format compatible with the processing capability of the playback device,
when the judgment unit judges that the at least one recorded content includes the content in the compatible format, the transmission unit cancels the transmission of the playback right and the capability information, and the acquisition unit acquires the content in the compatible format from the recording medium, and
when the judgment unit judges that the at least one recorded content does not include the content in the compatible format, the transmission unit executes the transmission of the playback right and the capability information.

15. A content distribution system that includes a server device for distributing contents, a playback device for playing back the contents, and a recording medium, wherein
the playback device comprises:
a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices;
an acquisition unit operable to, when the playback right is judged to have been confirmed, acquire, from the server device, one of the one or more contents corresponding to the playback right that is in a format compatible with the processing capability of the playback device indicated by the capability information; and
a playback unit operable to play back the content acquired by the acquisition unit, and
the server device comprises:
a reception unit operable to receive the playback right and the capability information from the playback device;
a verification unit operable to perform verification to judge whether the playback right has been confirmed; and
a distribution unit operable to, only when the verification unit judges that the playback right has been confirmed, distribute the content in the format compatible with the processing capability of the playback device indicated by the capability information to the playback device,
the recording medium has recorded therein, as the playback right, a certificate indicating that purchase of the one or more contents has been authenticated,
the transmission unit transmits the certificate,
when the server judges that the certificate has been verified, the acquisition unit acquires the content in the format compatible with the processing capability of the playback device indicated by the capability information,
the recording medium has further recorded therein, for each of the one or more contents that are each in a format compatible with a processing capability different for each of the playback devices, acquisition permission information indicating whether acquisition of each of the one or more contents is permitted,
the playback device further comprises
an acquisition judgment unit operable to, before the transmission transmits the certificate and the capability information to the server device, judge whether acquisition of the content in the compatible format by the playback device is permitted, with use of acquisition permission information indicating whether acquisition of the content in the compatible format by the playback device is permitted, and
when the acquisition judgment unit judges affirmatively, the transmission unit executes the transmission of the certificate and the capability information of the playback device to the server device.

16. A playback method for use in a playback device for playing back contents, the playback method comprising:
a transmission step of reading a playback right from an external recording medium, and transmitting the read playback right and capability information indicating a processing capability of the playback device to a server device, the playback right indicating a right to play back one or more contents that each have been generated based on a content and in a format compatible with a processing capability different for each of one or more playback devices;
an acquisition step of, when the playback right is judged to have been confirmed, acquiring, from the server device, one of the one or more contents corresponding to the playback right that is in a format compatible with the processing capability of the playback device indicated by the capability information; and
a playback step of playing back the content acquired by the acquisition step, wherein
the recording medium has recorded therein, as the playback right, a certificate indicating that purchase of the one or more contents has been authenticated,
the transmission step transmits the certificate,
when the server judges that the certificate has been verified, the acquisition step acquires the content in the format compatible with the processing capability of the playback device indicated by the capability information,
the recording medium has further recorded therein, for each of the one or more contents that are each in a format compatible with a processing capability different for each of the playback devices, acquisition permission information indicating whether acquisition of each of the one or more contents is permitted,
the playback method further comprises
an acquisition judgment step of, before the transmission transmits the certificate and the capability information to the server device, judging whether acquisition of the content in the compatible format by the playback device is permitted, with use of acquisition permission information indicating whether acquisition of the content in the compatible format by the playback device is permitted, and
when the acquisition judgment step judges affirmatively, the transmission step executes the transmission of the certificate and the capability information of the playback device to the server device.

17. A non-transitory computer-readable recording medium readable by a computer for use in a playback device for playing back contents, the recording medium having recorded therein a playback program that causes the computer to execute the following steps of:
a transmission step of reading a playback right from an external recording medium, and transmitting the read playback right and capability information indicating a processing capability of the playback device to a server device, the playback right indicating a right to play back one or more contents that each have been generated based on a content and in a format compatible with a processing capability different for each of one or more playback devices;

an acquisition step of, when the playback right is judged to have been confirmed, acquiring, from the server device, one of the one or more contents corresponding to the playback right that is in a format compatible with the processing capability of the playback device indicated by the capability information; and a playback step of playing back the content acquired by the acquisition step, wherein the recording medium has recorded therein, as the playback right, a certificate indicating that purchase of the one or more contents has been authenticated, the transmission step transmits the certificate, when the server judges that the certificate has been verified, the acquisition step acquires the content in the format compatible with the processing capability of the playback device indicated by the capability information, the recording medium has further recorded therein, for each of the one or more contents that are each in a format compatible with a processing capability different for each of the playback devices, acquisition permission information indicating whether acquisition of each of the one or more contents is permitted, the playback method further comprises an acquisition judgment step of, before the transmission transmits the certificate and the capability information to the server device, judging whether acquisition of the content in the compatible format by the playback device is permitted, with use of acquisition permission information indicating whether acquisition of the content in the compatible format by the playback device is permitted, and when the acquisition judgment step judges affirmatively, the transmission step executes the transmission of the certificate and the capability information of the playback device to the server device.

18. An integrated circuit for use in a playback device for playing back contents, the integrated circuit comprising:

a transmission unit operable to read a playback right from an external recording medium, and transmit the read playback right and capability information indicating a processing capability of the playback device to a server device, the playback right indicating a right to play back one or more contents that each have been generated based on a content and in a format compatible with a processing capability different for each of one or more playback devices;

an acquisition unit operable to, when the playback right is judged to have been confirmed, acquire, from the server device, one of the one or more contents corresponding to the playback right that is in a format compatible with the processing capability of the playback device indicated by the capability information; and a playback unit operable to play back the content acquired by the acquisition unit, wherein the recording medium has recorded therein, as the playback right, a certificate indicating that purchase of the one or more contents has been authenticated, the transmission unit transmits the certificate, when the server judges that the certificate has been verified, the acquisition unit acquires the content in the format compatible with the processing capability of the playback device indicated by the capability information, the recording medium has further recorded therein, for each of the one or more contents that are each in a format compatible with a processing capability different for each of the playback devices, acquisition permission information indicating whether acquisition of each of the one or more contents is permitted, the playback device further comprises an acquisition judgment unit operable to, before the transmission transmits the certificate and the capability information to the server device, judge whether acquisition of the content in the compatible format by the playback device is permitted, with use of acquisition permission information indicating whether acquisition of the content in the compatible format by the playback device is permitted, and when the acquisition judgment unit judges affirmatively, the transmission unit executes the transmission of the certificate and the capability information of the playback device to the server device.

* * * * *